(12) United States Patent
Vidor

(10) Patent No.: US 9,404,520 B1
(45) Date of Patent: Aug. 2, 2016

(54) CLAMPING DEVICES AND SYSTEMS FOR POSITIONING OBJECT IN 3-DIMENSIONAL SPACE

(71) Applicant: Bela M Vidor, Oakland, CA (US)

(72) Inventor: Bela M Vidor, Oakland, CA (US)

(*) Notice: Subject to any disclaimer, the term of this patent is extended or adjusted under 35 U.S.C. 154(b) by 0 days.

(21) Appl. No.: 15/068,382

(22) Filed: Mar. 11, 2016

Related U.S. Application Data

(63) Continuation-in-part of application No. 14/590,384, filed on Jan. 6, 2015, now Pat. No. 9,314,850, which is a continuation-in-part of application No. 13/937,603, filed on Feb. 2, 2014, now Pat. No. 8,956,070.

(51) Int. Cl.
*F16B 2/00* (2006.01)
*F16B 7/04* (2006.01)

(52) U.S. Cl.
CPC .................... *F16B 7/0473* (2013.01)

(58) Field of Classification Search
CPC ........ B27B 27/04; B27B 27/08; B27B 27/10; F16B 2/14; F16B 2/16; F16B 2/18; F16B 7/0446; F16B 7/0453; F16B 7/187; B23Q 3/005; E04B 2001/5881
USPC ............. 403/322.4, 374.1, 374.2, 374.5, 387, 403/400, 409.1; 83/446, 477.2
See application file for complete search history.

(56) References Cited

U.S. PATENT DOCUMENTS

| 2,711,909 A | 6/1955 | Duffle |
| 4,641,983 A | 2/1987 | Strassle |
| 4,941,125 A | 7/1990 | Boyne |

FOREIGN PATENT DOCUMENTS

| EP | 0257747 A2 | 3/1988 |
| EP | 0553286 A1 | 4/1992 |

*Primary Examiner* — Joshua Kennedy
(74) *Attorney, Agent, or Firm* — Adams Law Office; Sharon Adams

(57) ABSTRACT

Systems and devices using t-slot profiles and clamping devices to form a structure that may position an object in three-dimensional space. The clamping devices clamp two t-slot profiles together, either parallel or perpendicular to each other. The clamping device may be unlocked allowing t-slot profiles to move relative to each other, and then re-clamped, to lock the t-slot profiles in a new position. In some embodiments, the t-slot profiles and clamping devices form a structure that may position a camera in three-dimensional space over a table that supports at least one item to be photographed, and optionally digitized. The photographed items may comprise blueprints, artwork, architectural plans, and more.

17 Claims, 23 Drawing Sheets

CLAMPING DEVICES AND SYSTEMS FOR POSITIONING OBJECT IN 3-DIMENSIONAL SPACE

CROSS REFERENCE TO RELATED APPLICATION

This application claims the benefit of U.S. Pat. No. 8,956,070 with a filing date of Feb. 2, 2014, and further claims the benefit of pending U.S. patent application Ser. No. 14/590,384, with a filing date of Jan. 6, 2015. Both U.S. Pat. No. 8,956,070 and pending patent application Ser. No. 14/590,384 are incorporated herein by reference in their entirety. As provided in 37 CFR 1.78(c)(2), applicant identifies this application as a continuation-in-part of both U.S. Pat. No. 8,956,070 and U.S. Pat. No. 9,314,850. As encouraged in MPEP 608.04(b), this continuation-in-part specification incorporates applicant's desired amendments to the specification submitted in application Ser. No. 14/590,384.

STATEMENT REGARDING FEDERALLY SPONSORED RESEARCH

Not applicable.

NAMES OF THE PARTIES TO A JOINT RESEARCH AGREEMENT

Not applicable.

BACKGROUND OF THE INVENTION

1. Field of the Invention

The invention relates to systems and devices for securely clamping, unclamping, repositioning, and re-clamping t-slot metal profiles. Embodiments include securely and removeably clamping together metal profiles to build structures that may be used for any variety of reasons.

In one embodiment, the invention may be used to build a lift arm that is capable of positioning an object at a specific point in three-dimensional space. Embodiments of the invention are capable of vertically raising and lowering an object, thereby positioning the object at a specific vertical height, of extending the object forward and backward in a horizontal plane, and of moving the object from left to right in a horizontal plane. The object may be positioned and clamped at a specific position in three-dimensional space, at a specific point on x, y and z axes. In one non-limiting example of the field of the invention, the invention may be used to position a camera at a specific point in three-dimensional space over a table, that may be a vacuum table, that supports an item to be photographed.

In other embodiments, the invention may be used to accurately measure the distance from a saw blade by moveably clamping and unclamping profiles, where one profile is connected with a side fence at a specific distance from the saw blade as needed to cut a specific size of plastic, metal, wood, or other material. Additional embodiments may be used to moveably clamp one metal profile to another, to support cutting blades, turning devices, or any other devices.

2. Description of the Related Art

There are many situations where t-slotted profiles made of aluminum, steel or other materials are used to build structures, including trade show booths, machine bases, tool racks, fixtures, workbenches, assembly stations, display structures, storage structures and more. Many existing clamping devices are designed to secure one profile to the next.

These structures may be held together with any variety existing fasteners. These include end fasteners, anchor fasteners, double anchor fasteners, dynamic hinges, structural hinges and other types of connectors. However, these do not allow for easy unclamping, or for moving one profile relative to another profile and then securing the profiles in that position.

A non-limiting exemplar description of devices in the related art comprises devices for positioning and securing objects at a specific point in three-dimensional space, along x, y and z axes. Another non-limiting exemplar description of related art comprises devices for positioning and securing a camera at a specific point in three-dimensional space, along x, y and z axes and above an object to be photographed.

BRIEF SUMMARY OF THE INVENTION

Embodiments of invention are directed to systems and devices for securely and easily clamping t-slotted metal profiles to each other, and for moving t-slotted metal profiles relative to each other. The clamping devices allow for secure clamping and easy unclamping. The clamping device may move along a slot in a first t-slot profile, allowing the device to clamp at different places along the first t-slot profile.

In one embodiment, the invention may be used to position an object in three-dimensional space. T-slot profiles with clamping devices are connected together so that they may raise and lower the object along a vertical "z" axis, move the object forward and backward along a horizontal "x" axis, and may optionally move the object left and right along a "y" axis. The t-slot profiles and clamping devices are connected so that the object may be located at a specific position in three-dimensional space. Once in position, the clamping devices are used to lock the object at the desired position.

In a preferred embodiment, the invention may be used to position a camera in three-dimensional space above a table for photographing one or more items. In one embodiment, the table is a vacuum table capable of supporting items to be photographed, including large flat objects. A non-limiting example of a large flat object comprises large blueprints. In this embodiment, the vacuum is turned on and used to pull the blueprint flat against the table, removing wrinkles and making it easier to focus on, and photograph, the blueprint.

The clamping device is comprised of foot 11 connected by linking rod 10 to assembly 15. Assembly 15 connects with a second t-slot profile 22, wherein the second t-slot profile 22 has cavity 220. Assembly 15 is sized to snugly fit within cavity 220.

Elevator 9 is connected via linking rod 10 to foot 11. Upon manipulating handle 1, elevator 9 and linking rod 10 and foot 11 lift, resulting in foot 11 compressing against the inside of the t-slot, and locking the device in place.

Other embodiments of the invention allow for moveable and secure clamping and unclamping of a first t-slot profile to a second t-slot profile. This has numerous applications and embodiments, including rapid construction of trade show booths, display assemblies, and other structures that need to be securely clamped together, and easily unclamped, or devices that allow for adjusting two t-slot profiles relative to each other, and then clamping them together in the new position. The second t-slot profile may be parallel or perpendicular to the first profile. Additional embodiments comprise using the clamping devices to moveably slide one t-slot profile along a plurality of t-slot profiles.

DESCRIPTION OF THE SEVERAL VIEWS

Figure 11A:
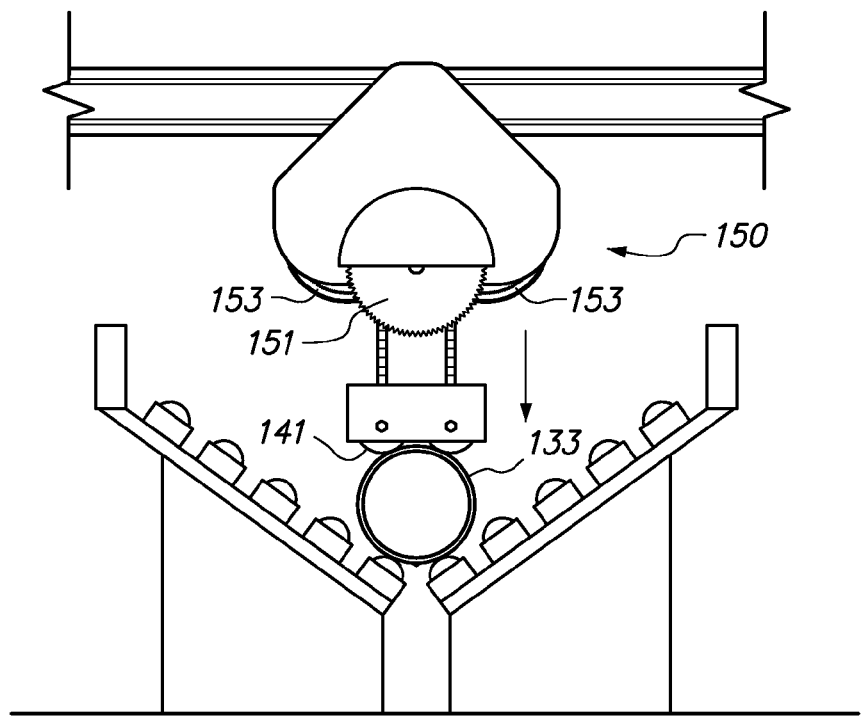
Figure 11B:
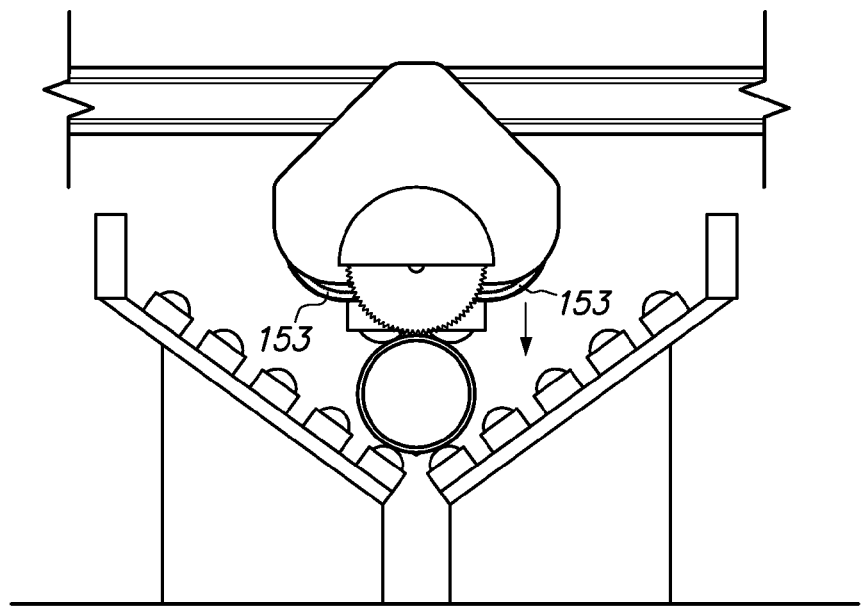
Figure 11C:
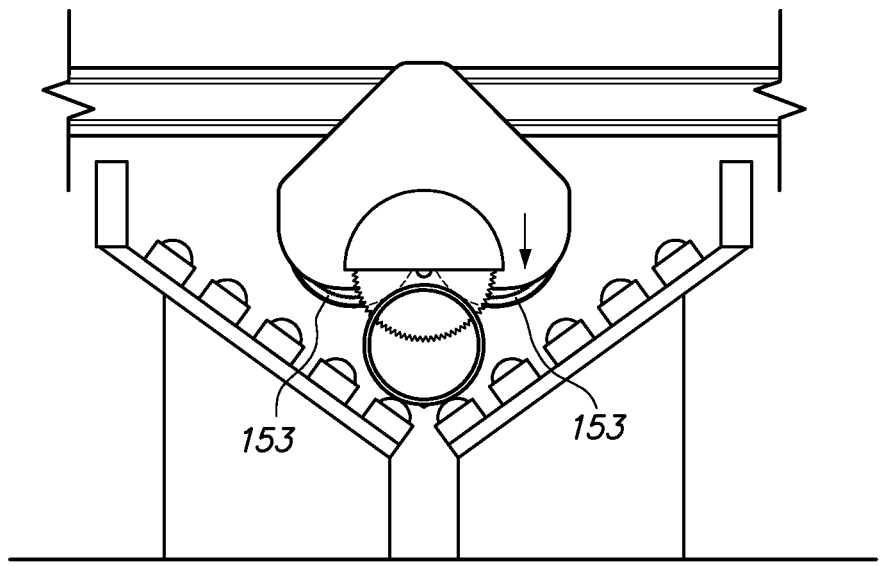

FIGS. 11A, B and C show close-up front plan views of stages of operation of the cutting device.

Figure 9:
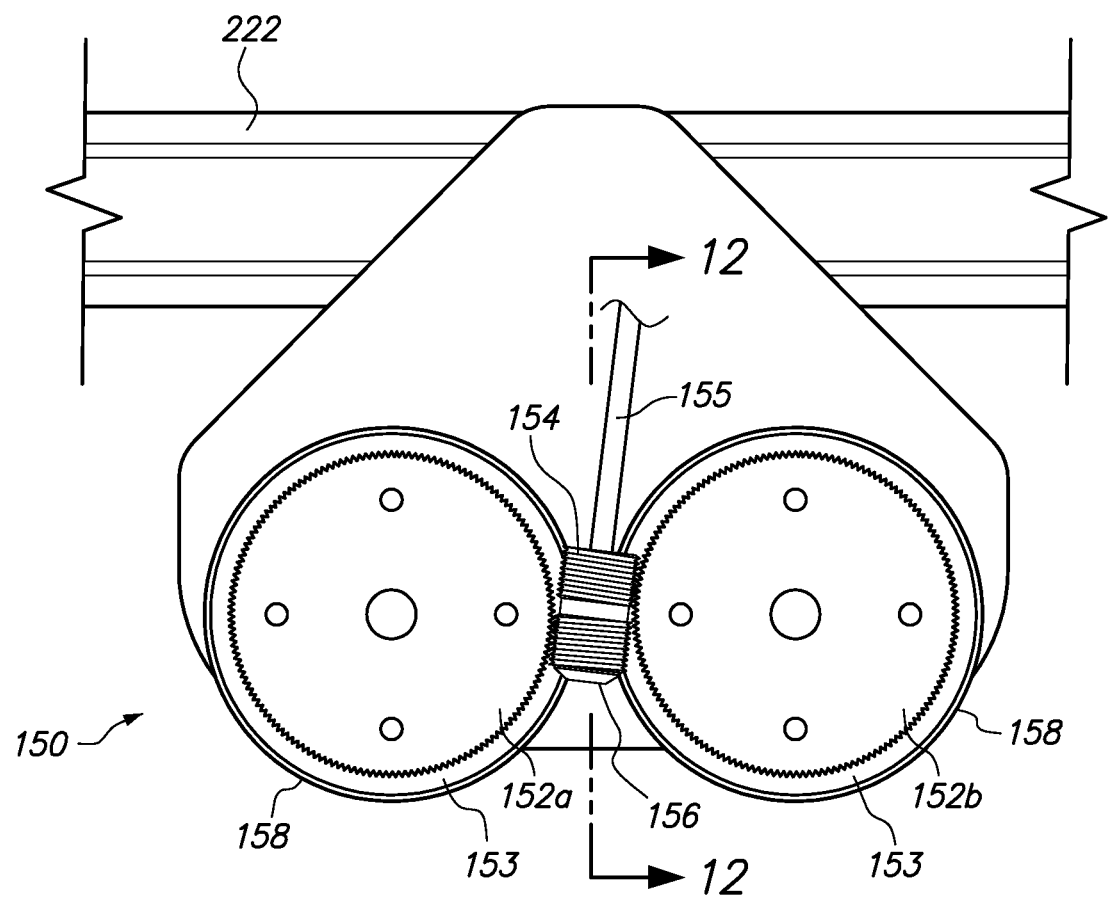
FIG. 9 is front plan view of internal components of the cutting assembly of the embodiment in FIG. 7.
Figure 10:
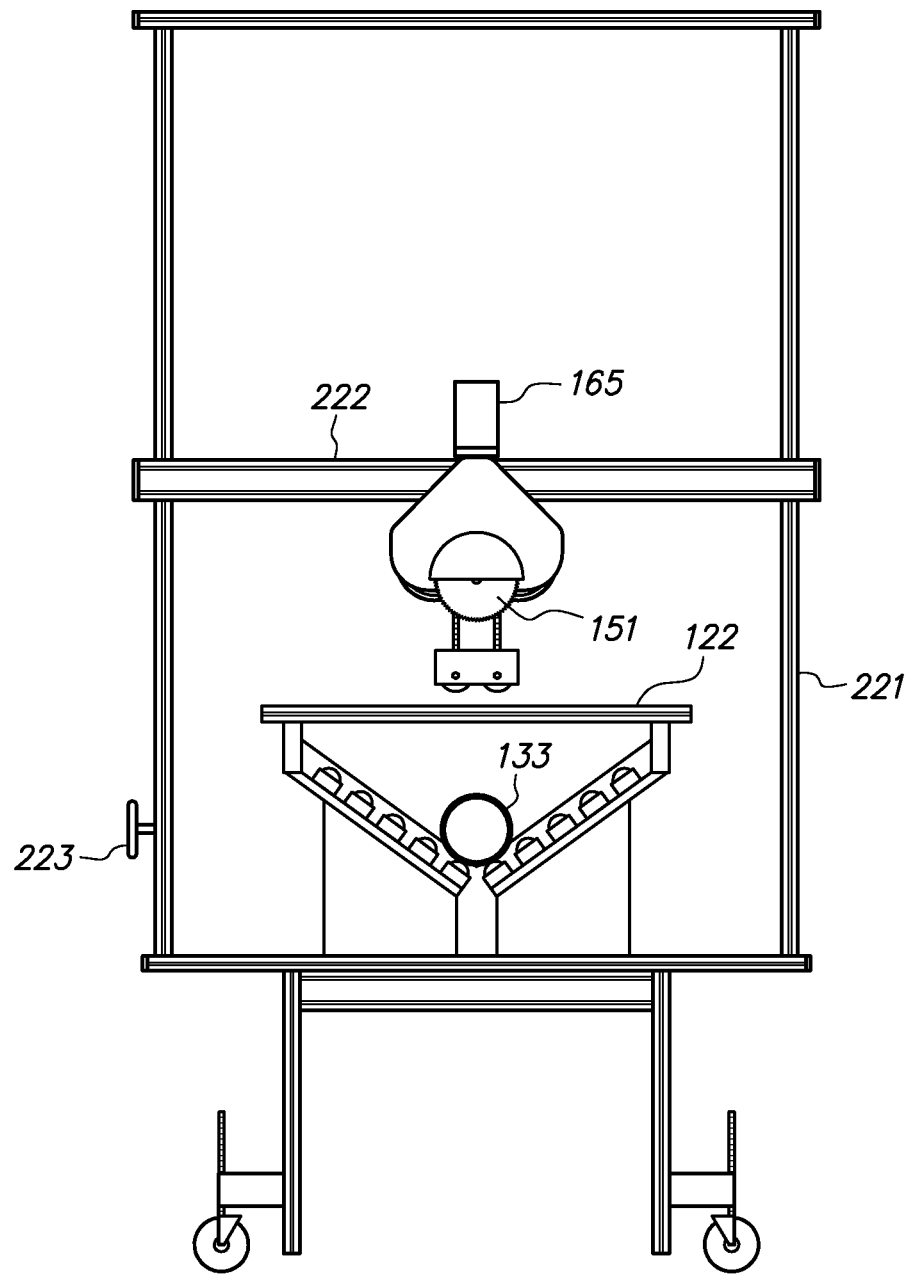
FIG. 10 is a front plan view of the cutting device.
Figure 12:
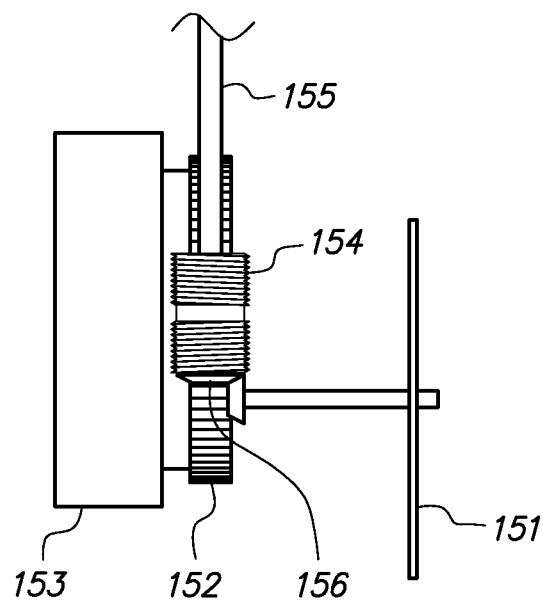

FIG. 12 is a close-up cross-sectional side view of the line indicated in FIG. 9.

Figure 13:
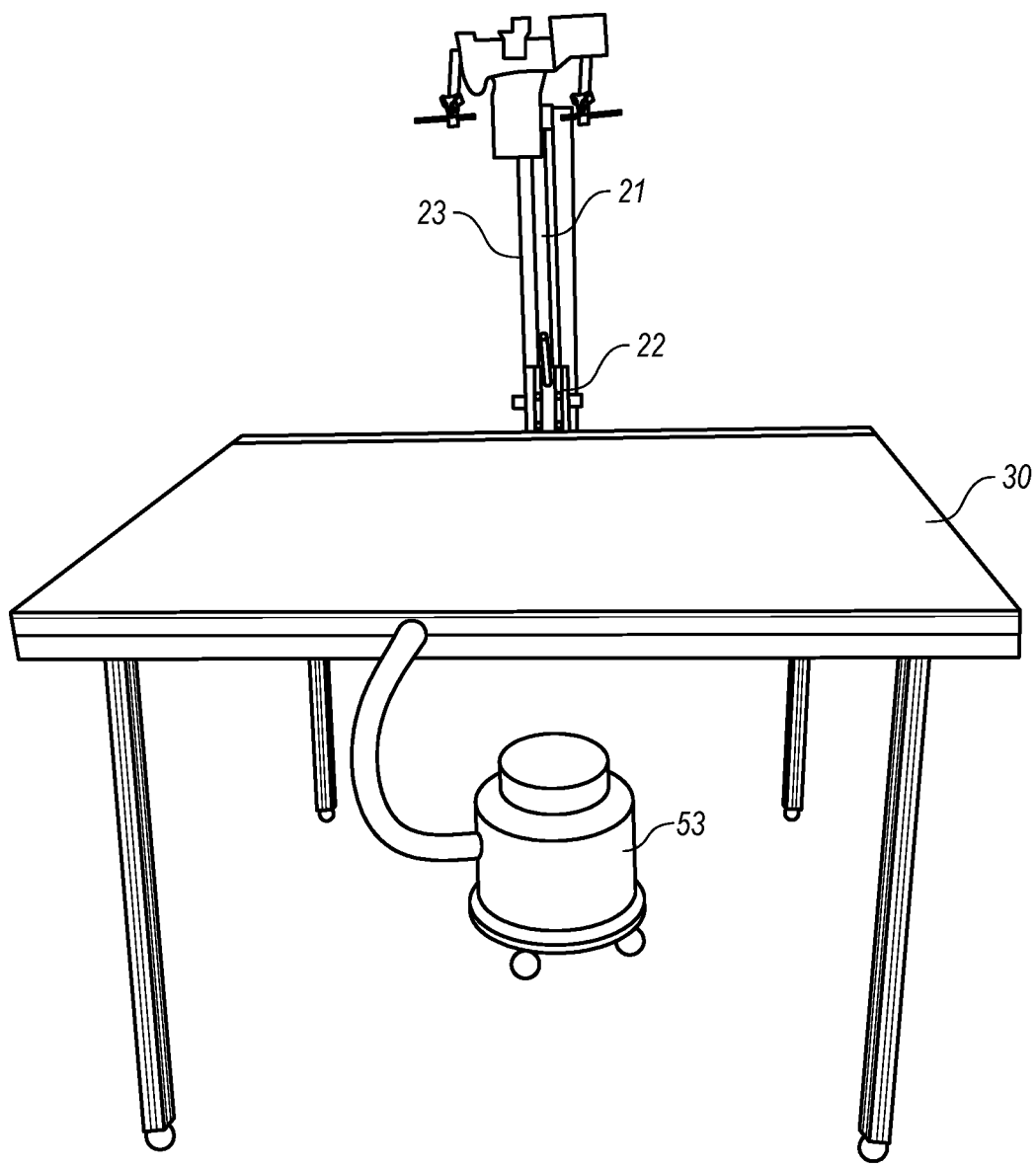

FIG. 13 is a front perspective view of an embodiment of the invention for positioning an object in three-dimensional space, in this embodiment for positioning a camera above a vacuum table.

Figure 14:
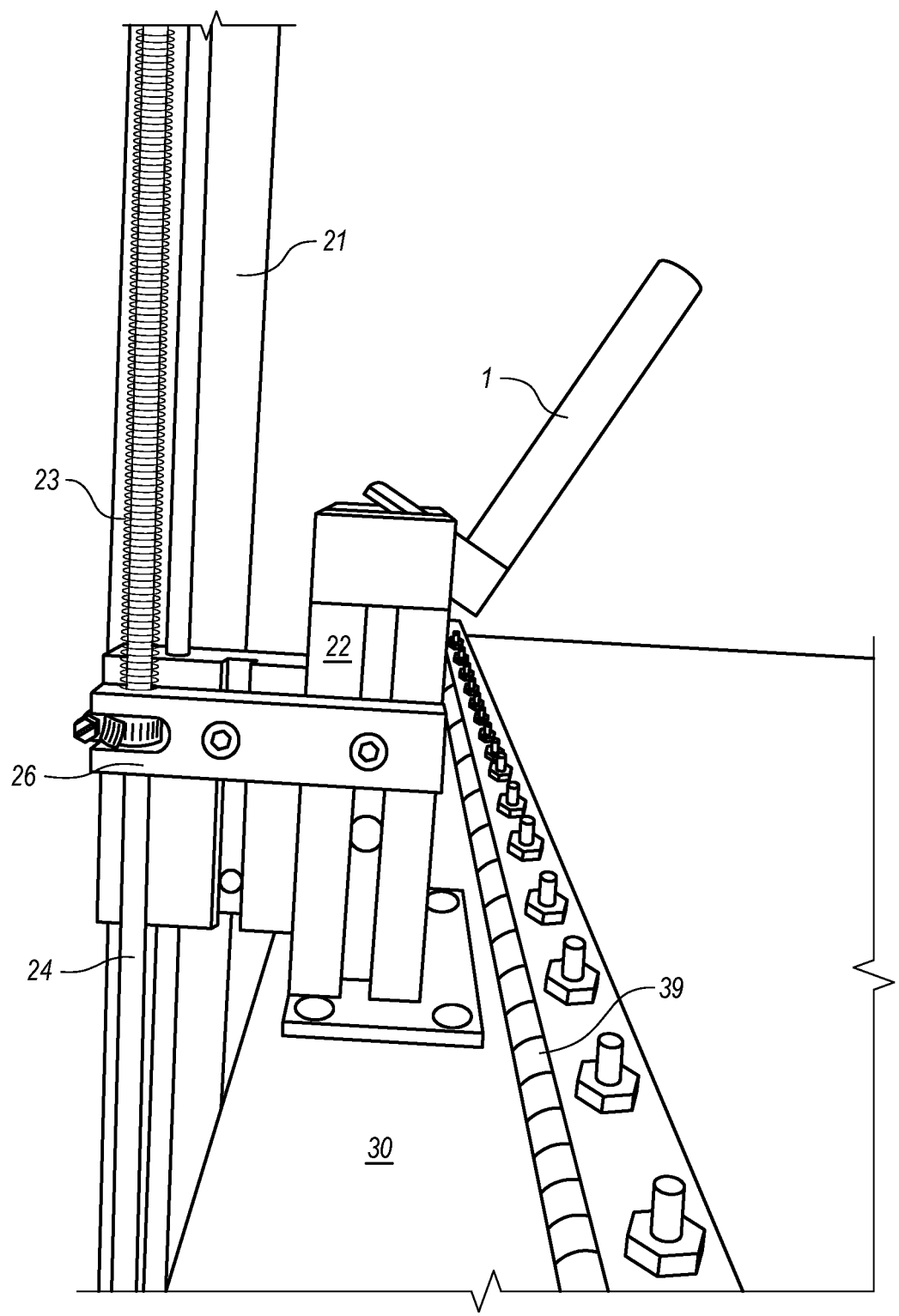

FIG. 14 is a close-up, partial side view of an embodiment of the clamping device.

Figure 15:
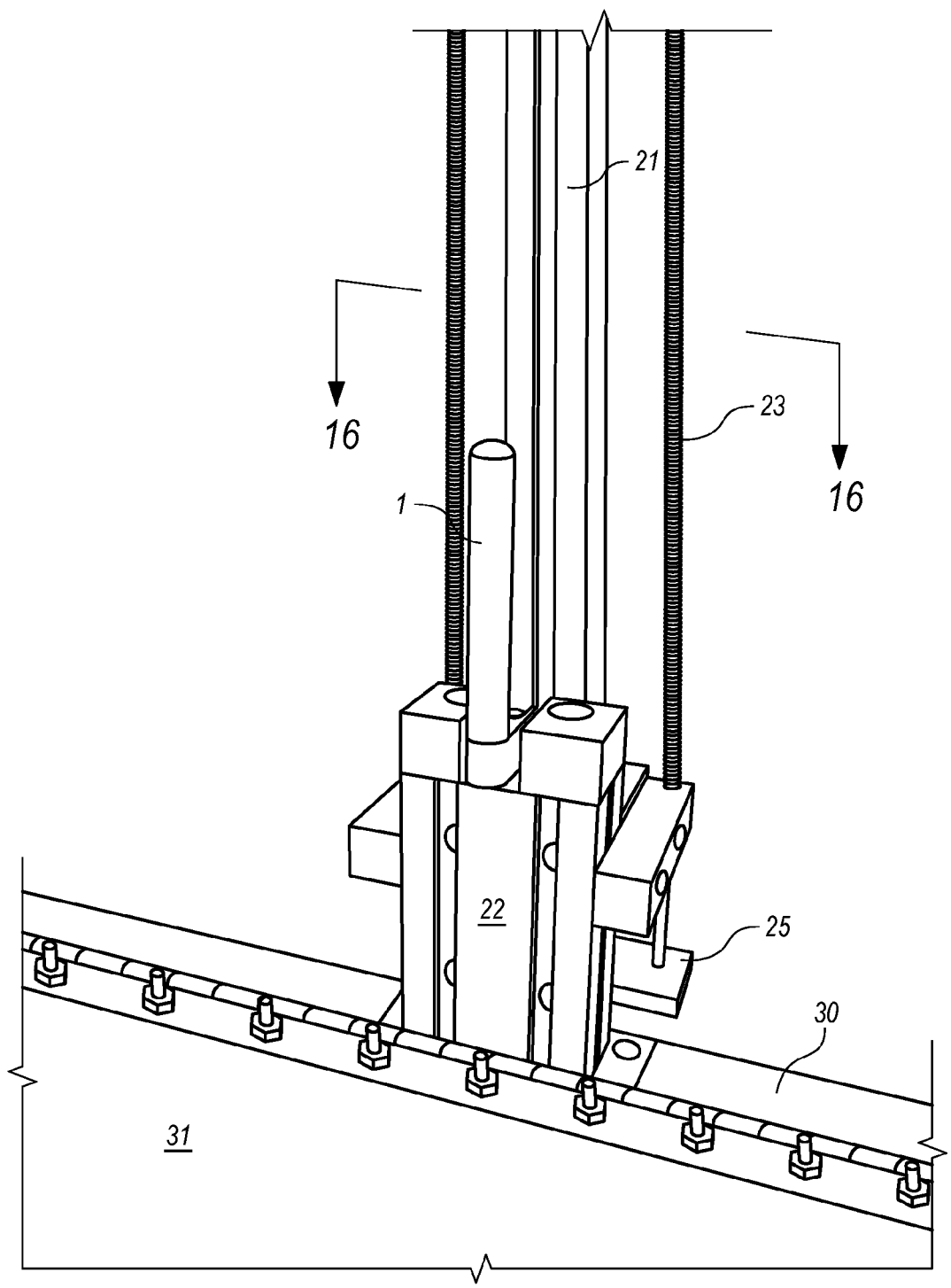

FIG. 15 is a close-up front perspective view of an embodiment of the clamping device connecting two vertical t-slot profiles.

Figure 16:
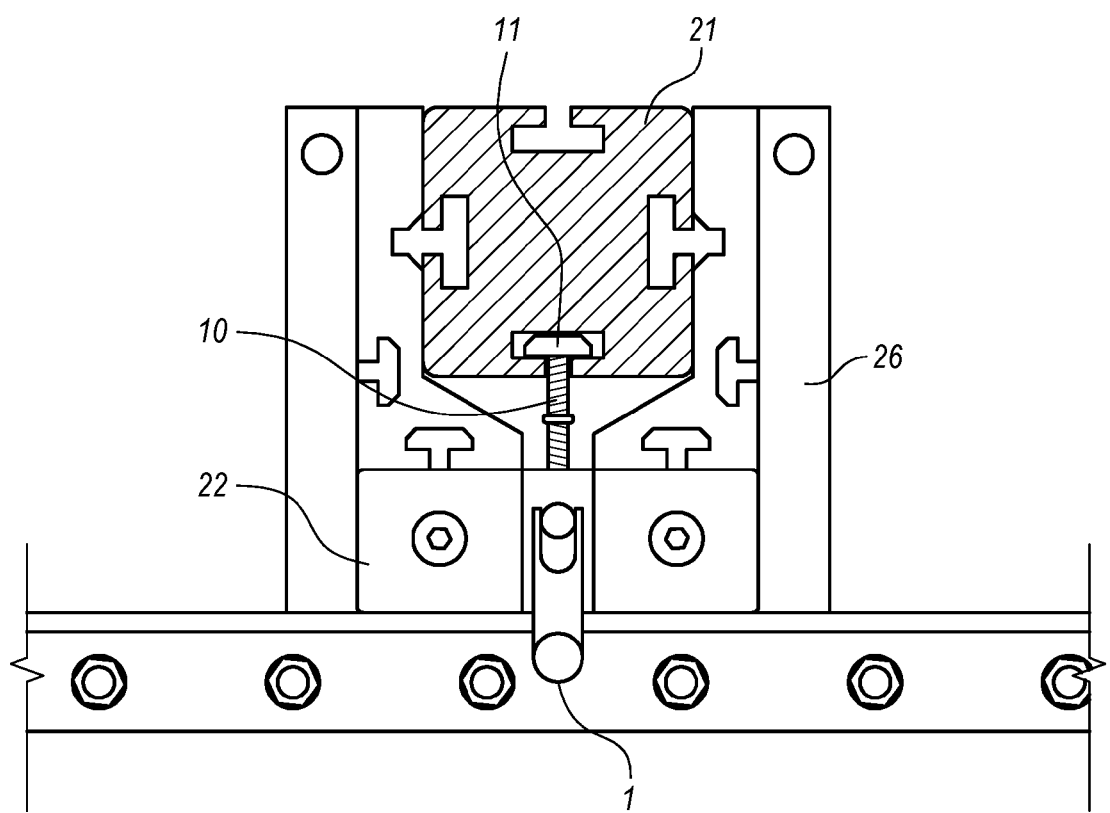

FIG. 16 is cross-section, plan view of an embodiment of the clamping device connecting a vertical t-slot profile to a horizontal table.

Figure 17:
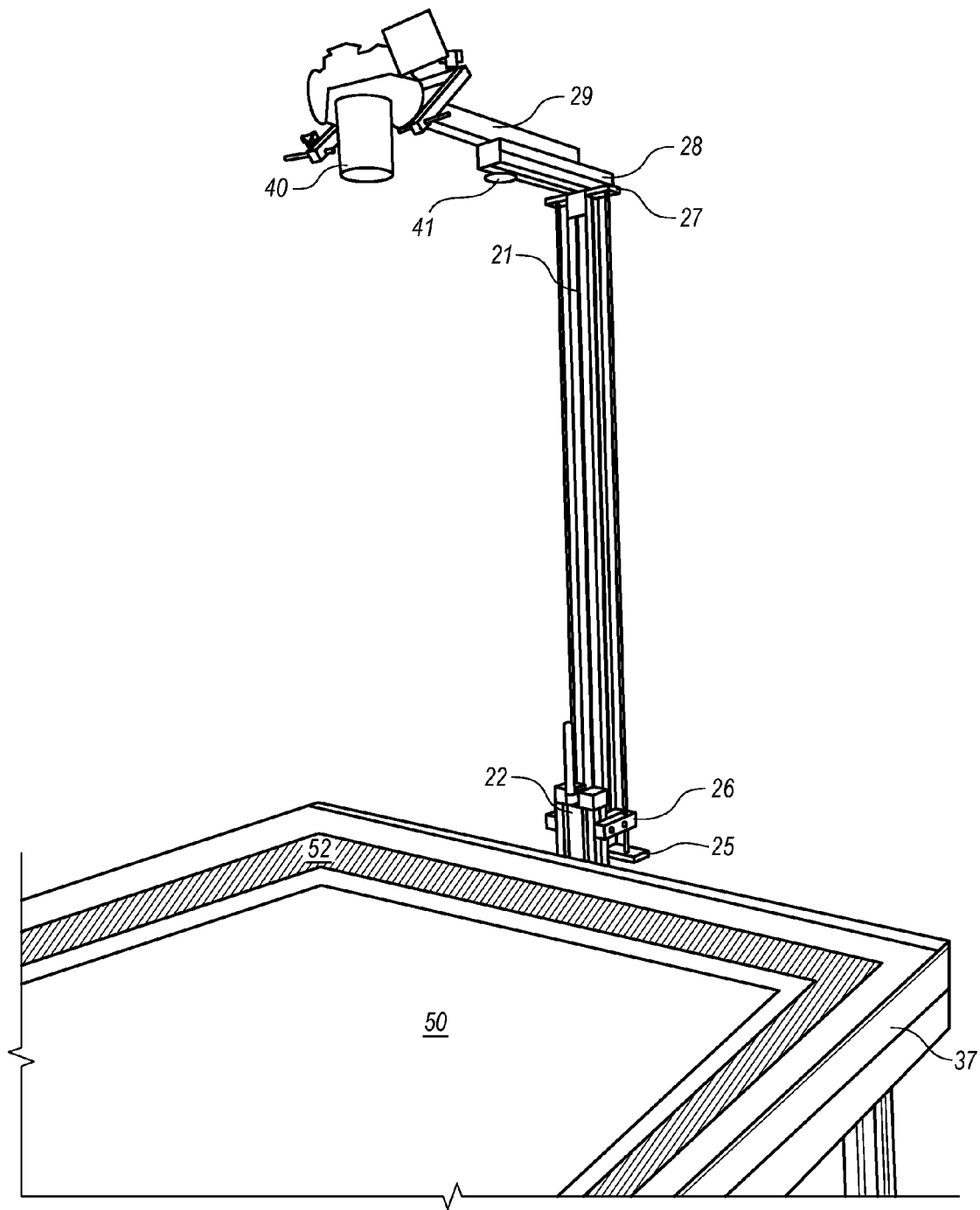

FIG. 17 is a partial perspective view of an embodiment of the invention.

Figure 18:
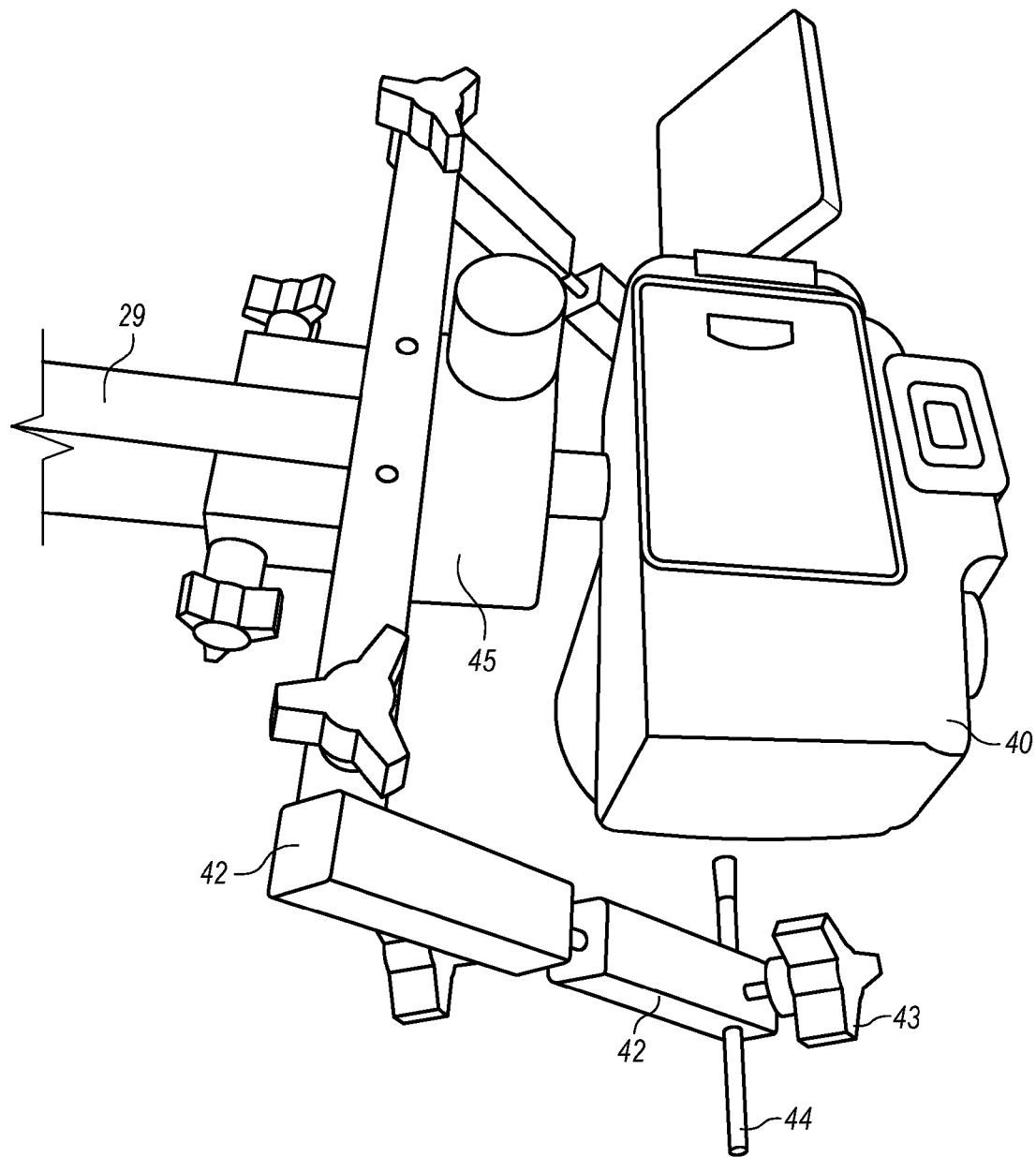

FIG. 18 is a close up, partial perspective plan view of an embodiment of the invention.

Figure 19:
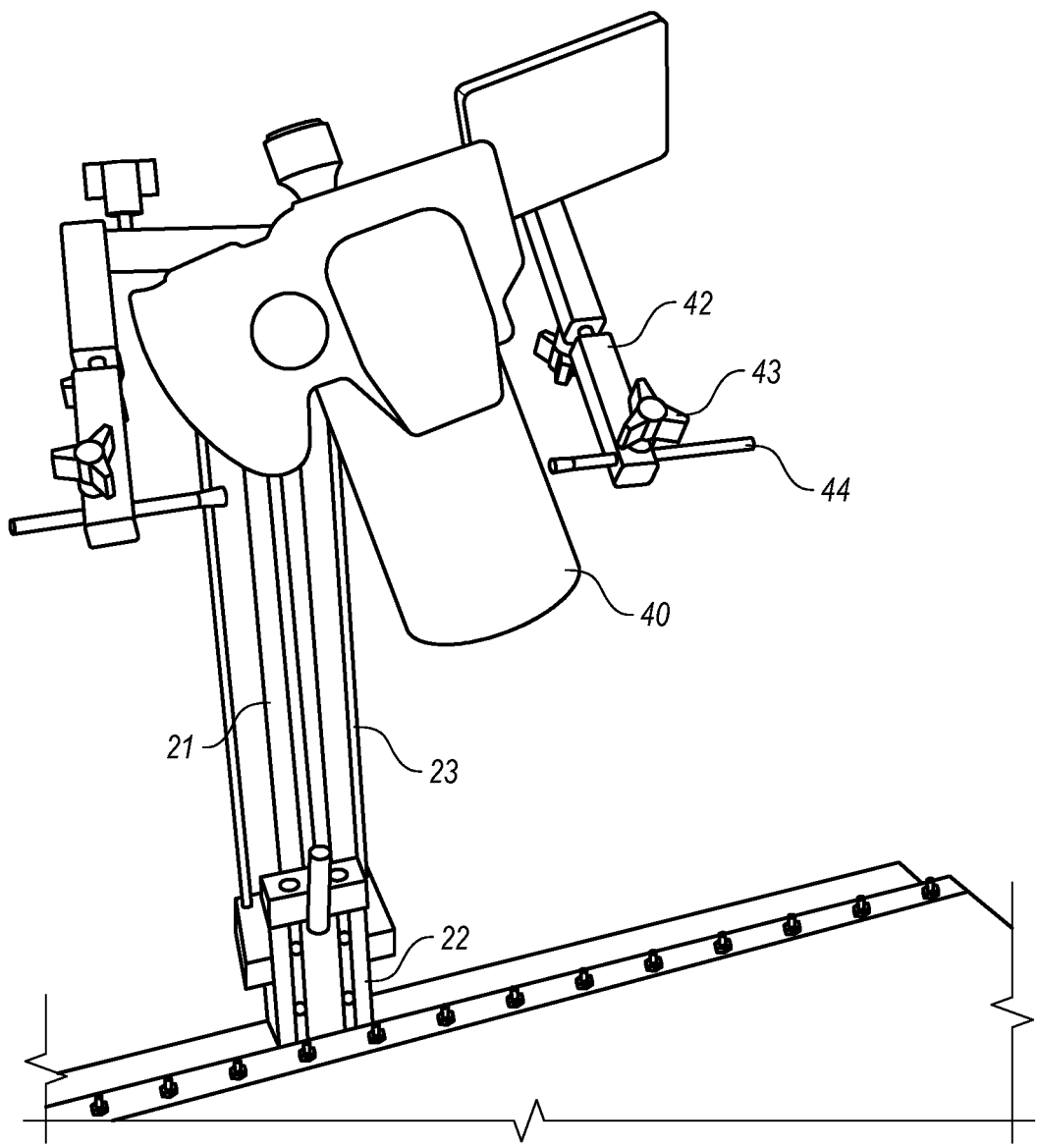

FIG. 19 is a partial perspective view of a camera connected with t-slot profiles, above a table.

Figure 20:
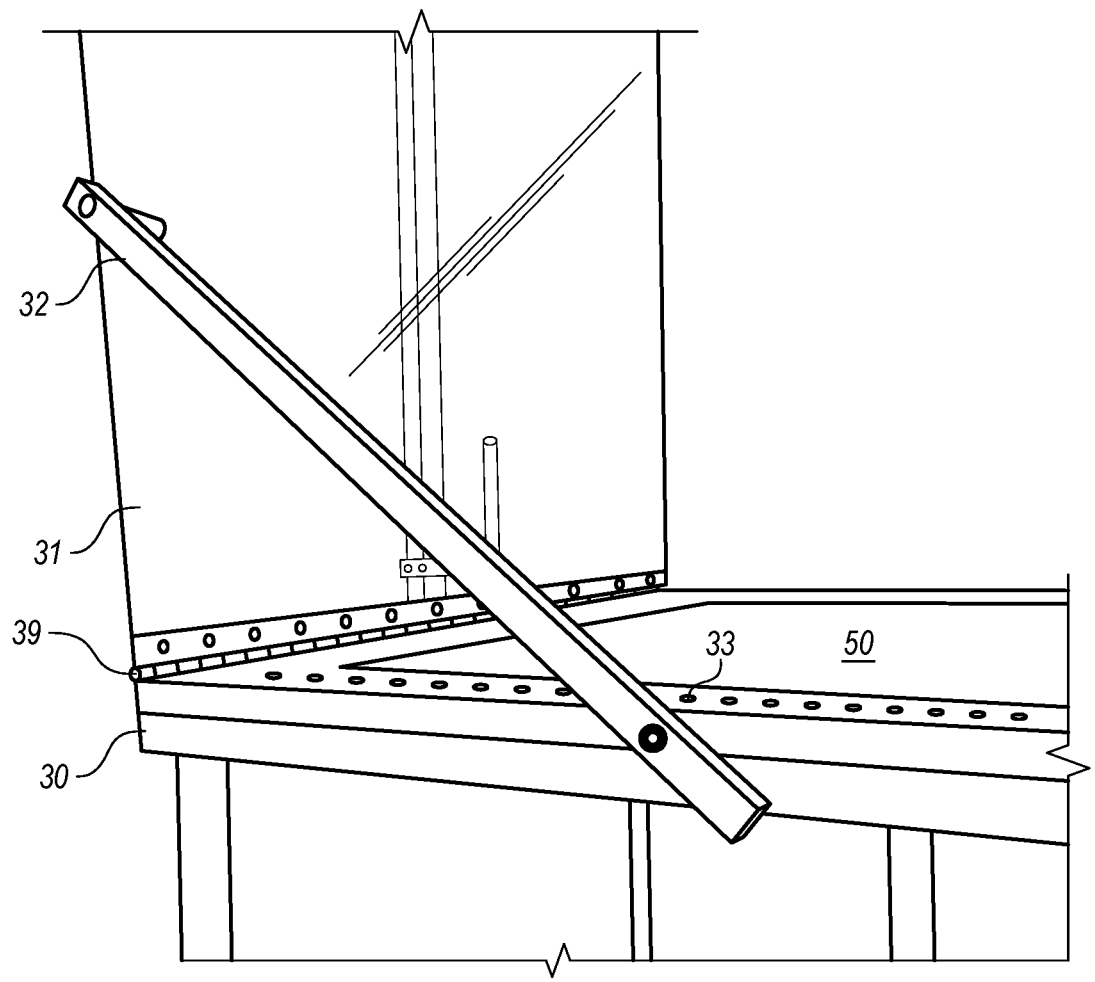

FIG. 20 is a partial perspective view of an embodiment of the invention, with support-arm.

Figure 21A:
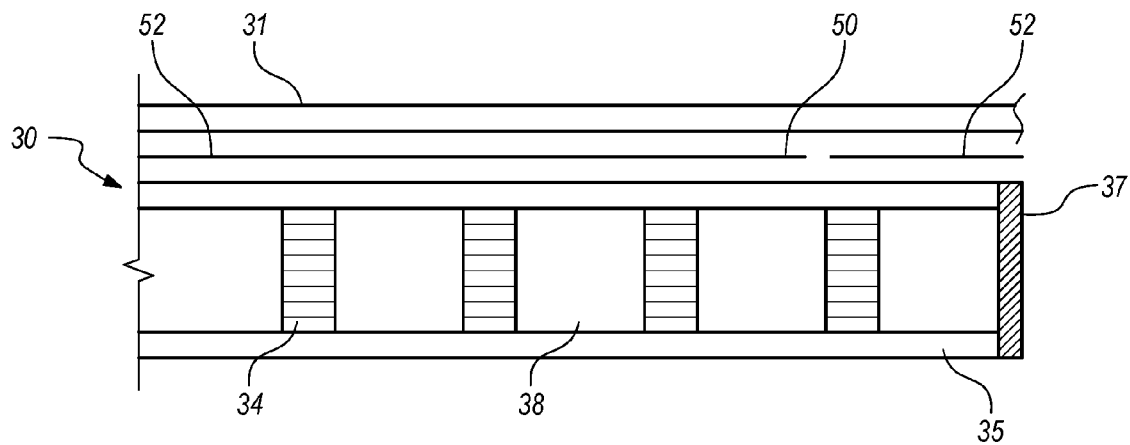

FIG. 21A is a partial, cross-section view of an embodiment of the interior of the vacuum table.

Figure 21B:
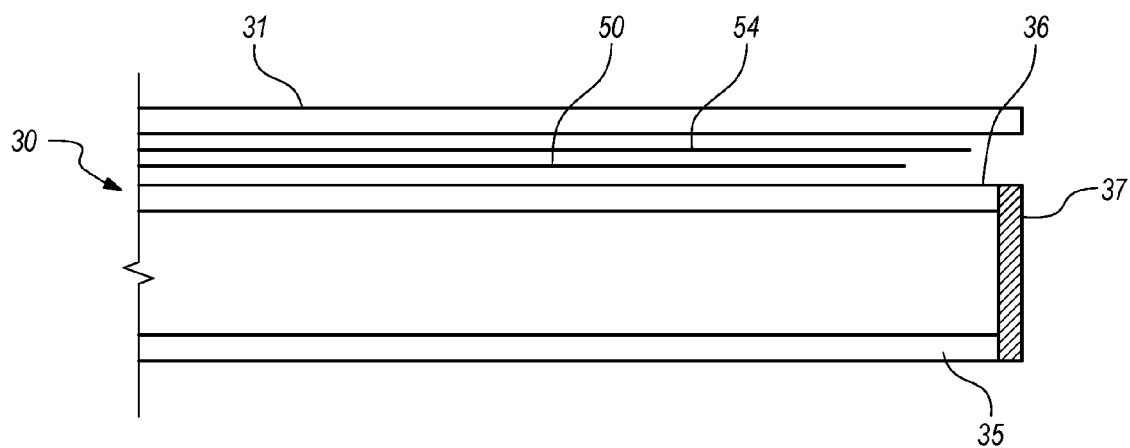

FIG. 21B is a partial, cross-section view of another embodiment of the interior of the vacuum table.

Figure 22:
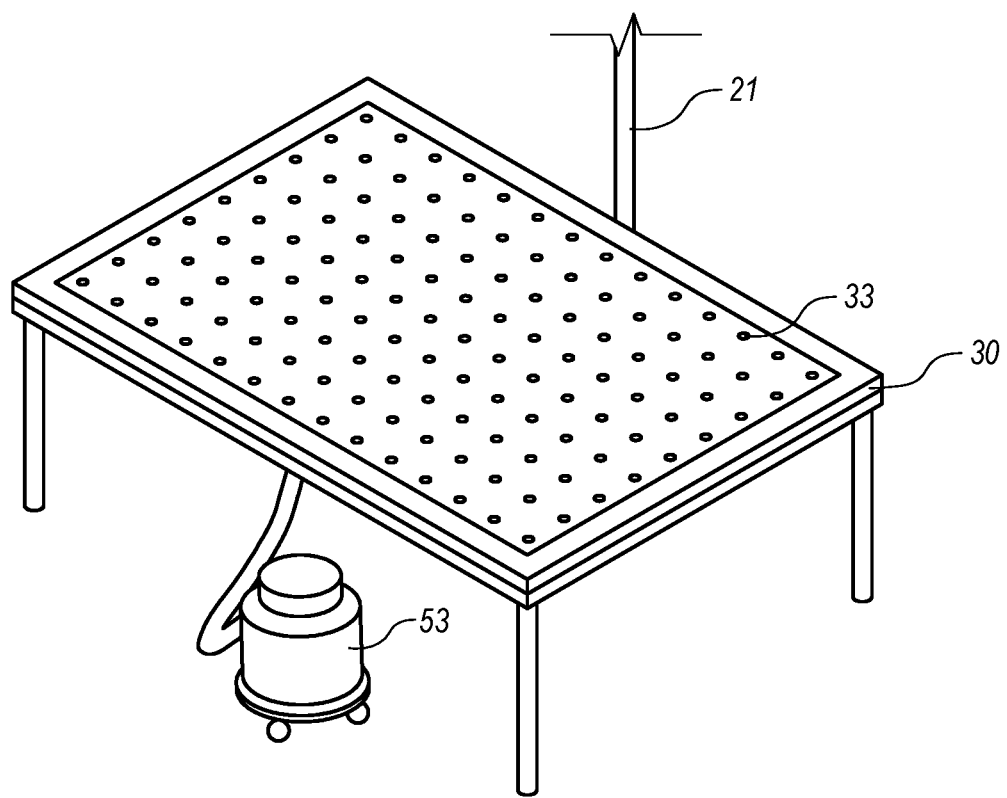

FIG. 22 is a partial perspective view of an embodiment of the invention.

Figure 23:
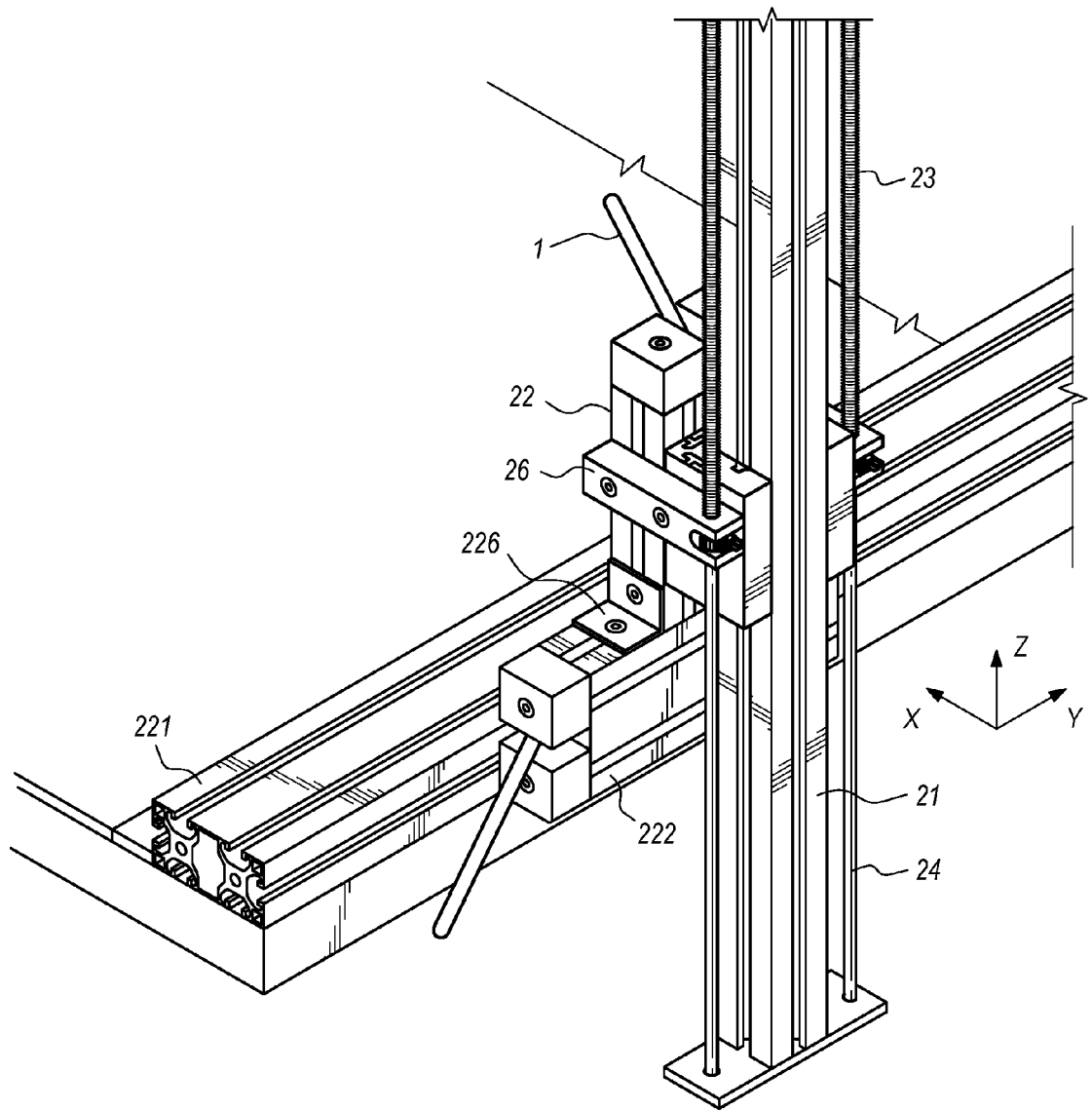

FIG. 23 is a close-up perspective view of an embodiment of the invention.

DETAILED DESCRIPTION

The invention comprises systems and devices for securely clamping and easily unclamping t-slot profiles. The clamping devices may be used to securely clamp together two t-slot profiles, and also allow for easy unclamping of the two t-slot profiles, moving the two t-slot profiles relative to each other, and then clamping them together in the new position. The clamping assembly may move along a first t-slot profile 21, allowing the invention to clamp at different places along the profile. Additional embodiments comprise using two clamping devices to moveably slide a first t-slot profile along two parallel t-slot profiles, where the first t-slot profile is perpendicular to the two parallel profiles.

Figure 1:
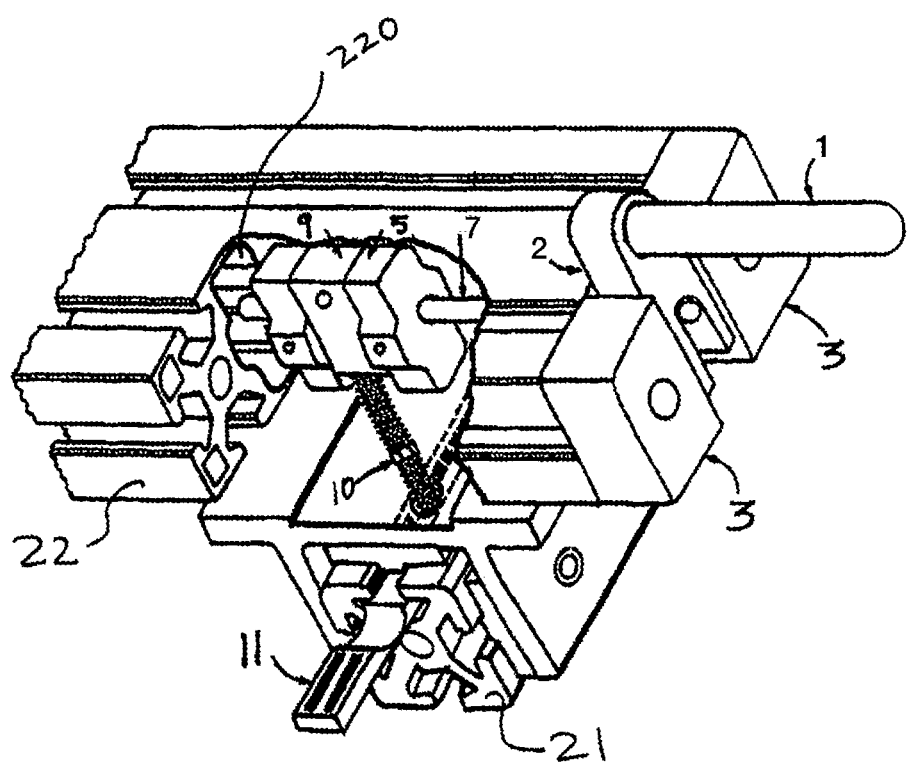
FIG. 1 is a perspective view of an embodiment of the invention, clamping two profiles together, with a cut-away view showing the assembly.
Figures 2A, 2B:
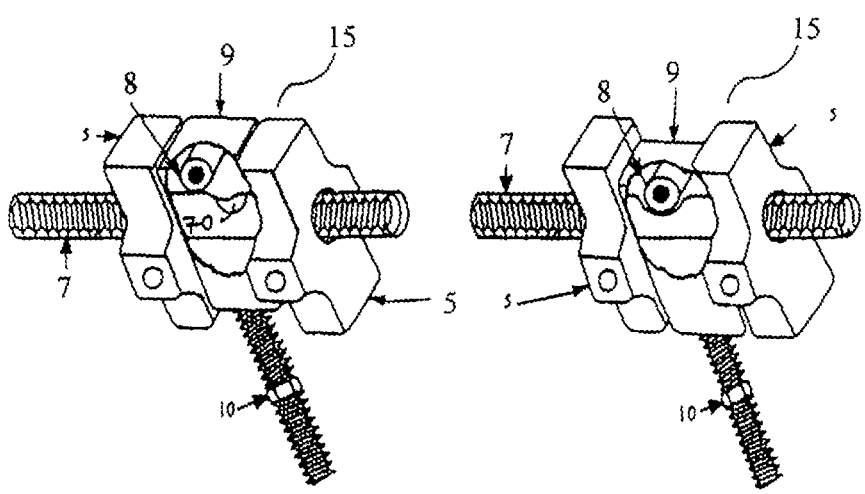
FIG. 2A is a perspective side view of an embodiment of the assembly, showing in cut-away view one position of the elevator and cam rod inside the assembly.
FIG. 2B is a perspective side view of an embodiment of the assembly, showing in cut-away view a second position of the elevator and cam rod inside the assembly.

The clamping device is comprised of locking foot 11, connected with linking rod 10, which is connected with elevator 9 within clamping assembly 15, as shown in FIGS. 1, 2A and 2B. Linking rod 10 and locking foot 11 are sized to moveably fit within a slot of first profile 21, and may move along the entire length of the slot in the first profile 21.

Locking foot 11 fits snugly within a slot of the first profile 21, as shown in FIG. 1. FIG. 4B shows exemplar cross-sections of profiles 21, with various slot shapes and sizes. The locking foot 11 may be made of any size or shape, as needed to snugly and moveable fit with the required slot and to travel along the slot.

The locking foot may also have differing levels of stiffness or spring. In some embodiments, locking foot 11 may have cutouts 110. The size and depth of cutouts 110 affect the stiffness or springiness of the locking foot. There may be instances where little or no spring is needed, and for these situations, locking foot 11 may have no cutouts at all, as shown in FIG. 5A.

Figures 5A, 5B, 5C:
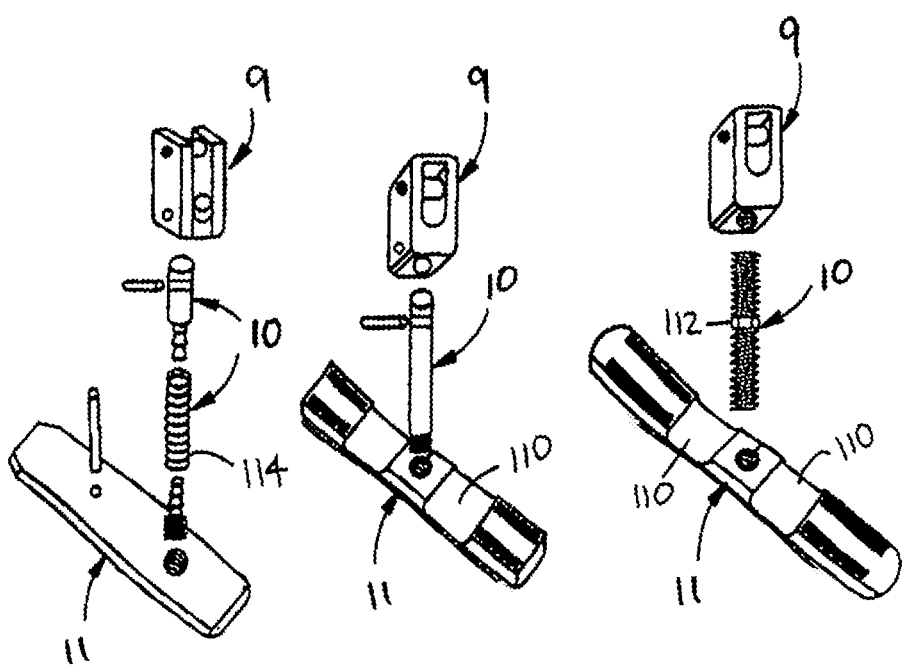
FIG. 5A is a perspective side view of one embodiment of the linking rod, locking foot and other components of the invention.
FIG. 5B is a perspective side view of one embodiment of the linking rod, locking foot and other components of the invention.
FIG. 5C is a perspective side view of one embodiment of the linking rod, locking foot and other components of the invention.

In some embodiments, locking foot 11 may be flat, as shown in FIG. 5A. In other embodiments, locking foot 11 may be slightly curved, as shown in FIGS. 5B and 5C. The slight curve provides additional springiness. In other embodiments, locking foot 11 may have non-slip pads 115. In other embodiments, locking foot 11 may be of different lengths, as shown in FIGS. 5A, 5B, and 5C.

In a preferred embodiment linking rod 10 is a dual-threaded linking rod, meaning that it has both left-handed and right-handed threads that allows for precise adjustment of the height of linking rod 10. Adjusting the height of linking rod 10 allows for adjustment in the amount of tension connecting locking foot 11 with the inside of the t-slot. In this embodiment, as shown in FIG. 2B, linking rod 10 has left-handed threads on one side of spacer 112, and right-handed threads on the other side of spacer 112. In these embodiments, the height of linking rod 10 may be precisely adjusted by turning a screw on the underside of locking foot 11.

In other embodiments, linking rod 10 may be solid, as shown in FIG. 5B. In other embodiments, linking rod 10 may include a spring 114, as shown in FIG. 5A. Spring 114 is another embodiment that allows for adjustment in the total distance between locking foot 11 and elevator 9.

Assembly 15 is comprised of elevator 9, tightly sandwiched between guides 5. Linking rod 10 is connected with elevator 9. Elevator 9 may move up and down relative to guides 5, but will not move forward or backward or sideways relative to guides 5, as shown in FIGS. 2A and 2B. Assembly 15 is sized, as needed, to snugly fit within cavity 220.

Push-pull elevating cam-rod 7 runs through guides 5 and elevator 9. Rod 7 contains pocket 70, and pocket 70 is positioned to be within elevator 9, as shown in FIG. 2.

Elevator 9 is connected with rolling bushing 8. In some embodiments, rolling bushing 8 may be a separate piece, and in other embodiments rolling bushing 8 and elevator 9 may be a single unit. Rolling bushing 8 and pocket 70 are positioned so that when the device is unclamped, bushing 8 rests within pocket 70. When the operator manipulates handle 1, rod 7 moves forward (or backward) relative to bushing 8, and bushing 8 rises out of pocket 70. As bushing 8 moves out of pocket 70, elevator 9 rises up, as shown in FIG. 2A. When elevator 9 lifts up, locking foot 11 is also lifted via linking rod 10, thereby lifting and compressing the locking foot 11 against the inside of the t-slot in the first profile 21.

Figure 6A:
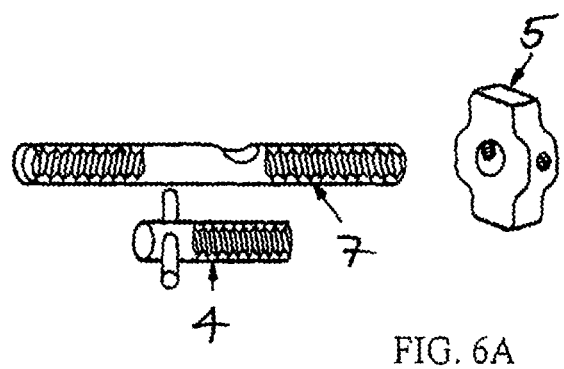
FIG. 6A shows one embodiment of components of the invention, with a circular push-pull elevating cam-rod and front stem.
Figure 6B:
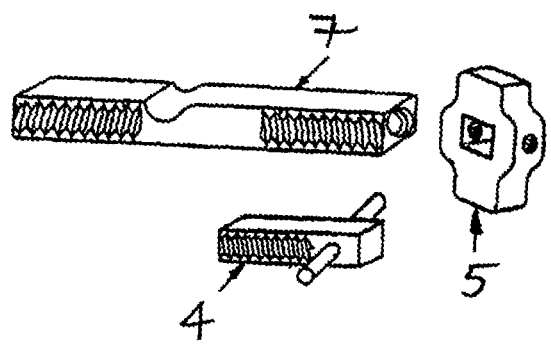
FIG. 6B shows another embodiment of components of the invention with a rectangular or square push-pull elevating cam-rod and front stem.
Figure 7:
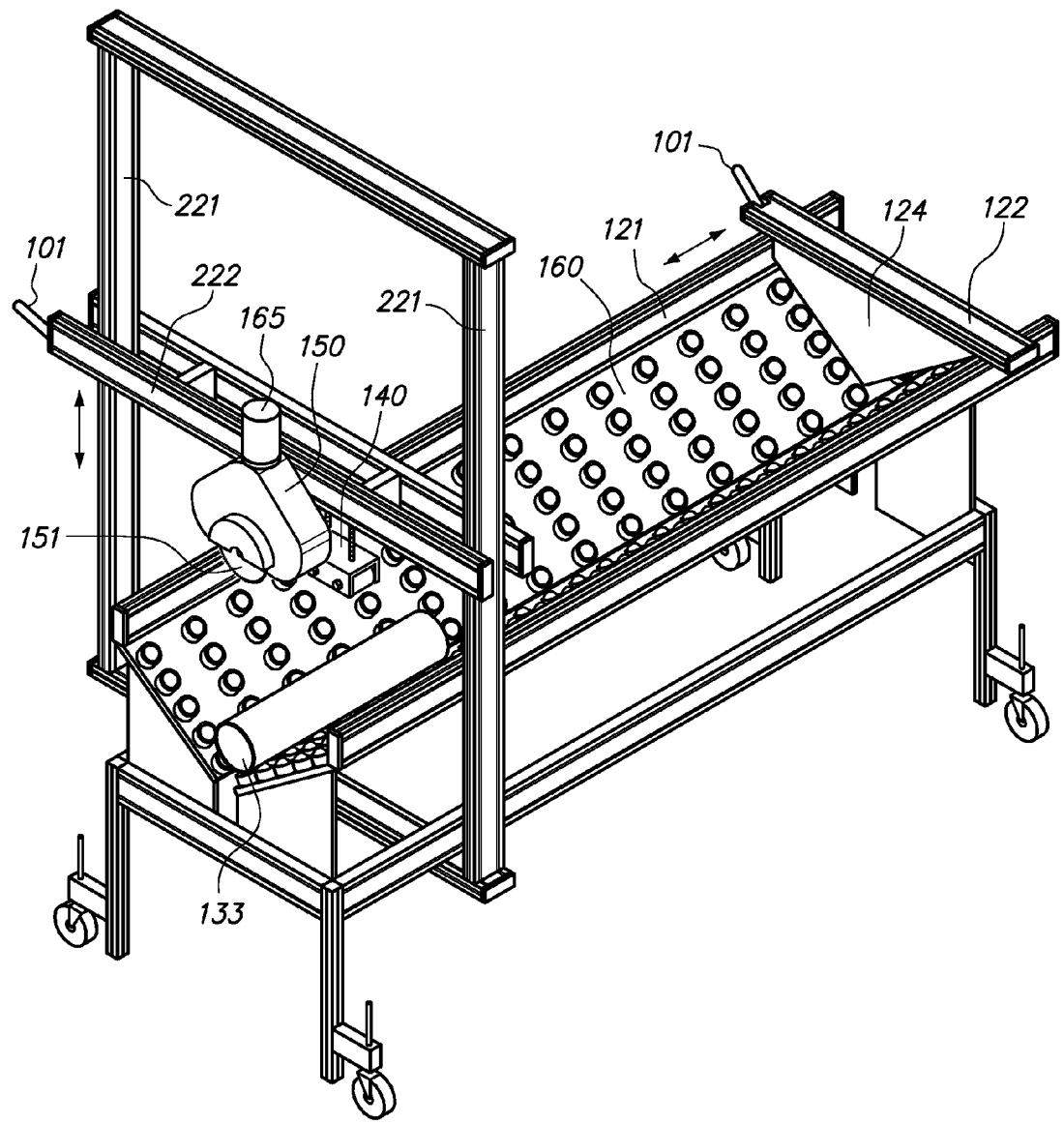
FIG. 7 is a front perspective view of an embodiment of the invention, where t-slot profiles and clamping devices create a structure for cutting annular objects.
Figure 8:
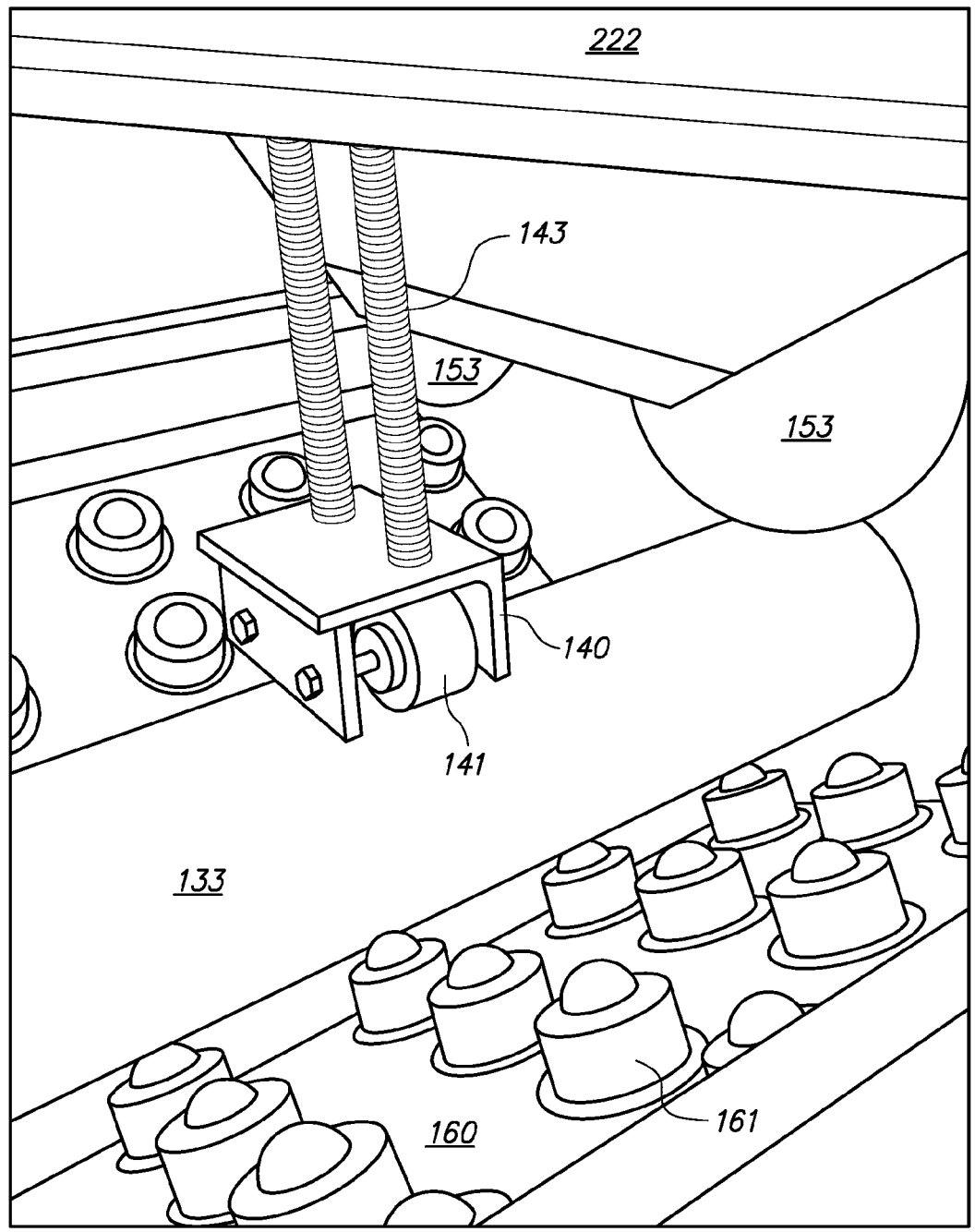
FIG. 8 is a close-up rear perspective view of a part of the embodiment of FIG. 7, showing clutch-wheels in contact with an annular object.

In some embodiments, pocket 70 is on the top of rod 7, while in other embodiments, pocket 70 may be on the bottom on rod 7, or in any of position on rod 70 that is within elevator 9. Rod 70 may be round, or square or any other shape provided that rod 70 fits within guides 5, as shown in FIGS. 6A and 6B.

Figure 3:
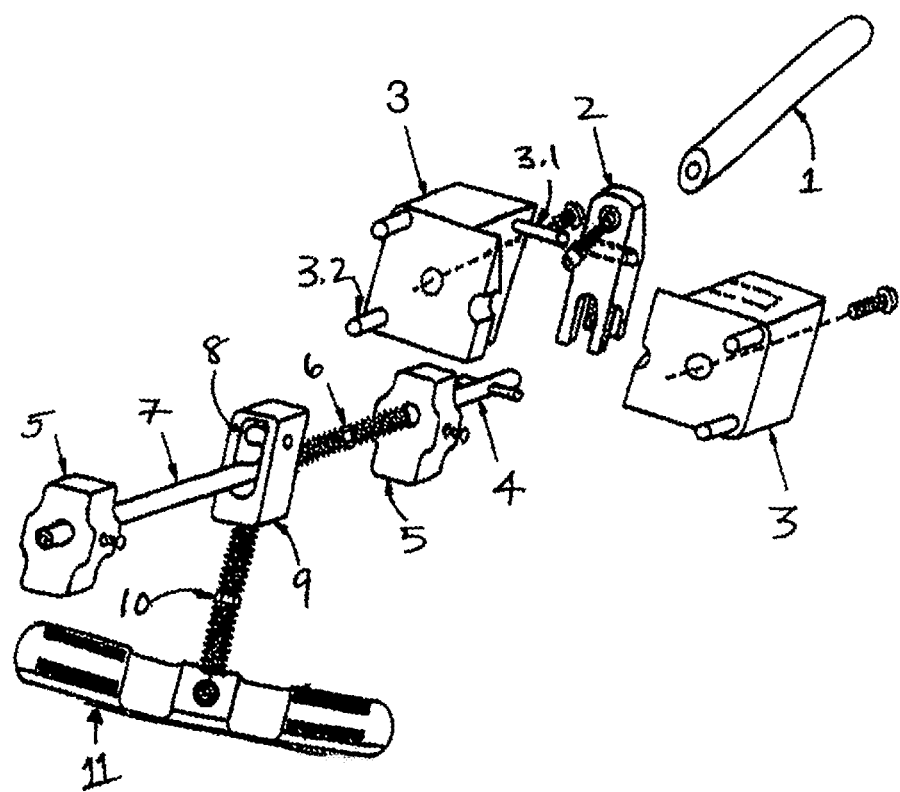
FIG. 3 is an exploded view of an embodiment of the invention.

Rod 7 moves forward or backward in response to operator manipulation of handle 1. In some embodiments, handle 1 is connected with fulcrum fork 2, as shown in FIG. 3. Manipulating handle 1 causes fulcrum fork 2 to pivot on fulcrum pin 3.1. Upon pivoting, fork 2 engages push/pull pin 3.1 and moves pin 3.1 forward (or backward). In some embodiments, pin 3.1 is connected with rod 7, so than when the operator manipulates handle 1, fork 2 pushes pin 3.1 resulting in rod 7 moving backward relative to elevator 9 and bushing 8. Bushing 8 will move out of pocket 70, causing elevator 9 to rise up, lifting locking foot 11 up and pressing it against the t-slot of the first profile 21. The clamping device is thereby securely locked in place.

To unlock the device, the operator manipulates handle 1, moving rod 7 until bushing 8 rests in pocket 70. This allows elevator 9 to descend, thereby causing locking foot 11 to move away from the inside of the first profile t-slot 21. In the unlocked position, rolling bushing 8 rests within pocket 70 of push-pull elevating cam-rod 7.

In some embodiments, pin 3.1 is connected with front stem 4 which in turn pushes the threaded extension rod 6 that is in turn connected with rod 7, which moves relative to bushing 8, as shown in FIG. 3. In some embodiments front stem 4 is an internally threaded stem, as shown in FIG. 6A.

In some embodiments, fulcrum pin 3.1 is held in position by fulcrum support 3, as shown in FIG. 3. Fulcrum support 3 is comprised of fulcrum pin 3.1 and profile connection pin 3.2. In some embodiments, profile connection pin 3.2 may connect the clamping device to the second profile.

Figure 4A:
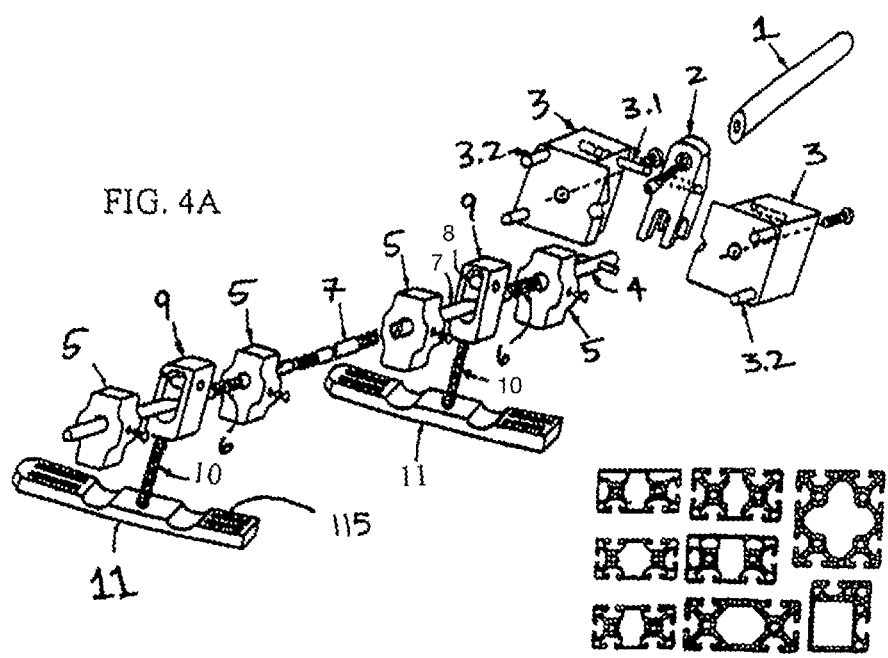
FIG. 4A is an exploded view of another embodiment of the invention.
Figure 4B:
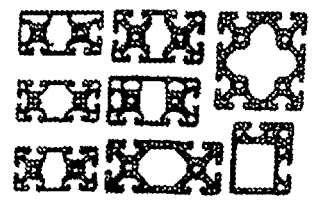
FIG. 4B shows, as non-limiting examples, some t-slotted profiles with inside surfaces.

In some embodiments, the clamping devices may be linked with multiple clamping assemblies in a row, as shown in FIG. 4, using threaded extension rods 6, with adjustability. This clamping and locking device may be operated in a parallel relationship direction, or a 90-degree relationship direction. The clamping grip is adjustable to a load well above 50 pounds per square inch.

Other embodiments of the invention comprise using the clamping devices to clamp t-slot profiles to each other, to create easy-to-assemble structures, or structures that are securely clamped together and easily unclamped, as needed. The first profile 21 and the second profile 22 may be made of any length, shape or size, as needed to create a desired structure.

As shown in FIG. 13, in some embodiments, t-slot profiles may be connected to form a structure that is used to position a camera in three-dimensional space above a table that supports at least one item to be photographed. First profile 21 may be perpendicular or parallel to second profile 22.

In one embodiment, t-slot profiles may be used to form a vertical lift arm. FIGS. 14 and 15 show that a first t-slot profile 21 may move vertically up and down relative to a second t-slot profile 22. In this embodiment, both t-slot profile 21 and t-slot profile 22 are parallel to each other and connected with each other by the clamping mechanism that is shown in FIG. 1. FIG. 16 shows a cross-section of locking foot 11 engaged with a t-slot in profile 21, and the clamping assembly 15 is inside profile 22, when two t-slot profiles are parallel to each other.

As explained above, the operator manipulates handle 1 to lock and unlock the clamping device. Handle 1 may be manipulated to unlock the clamping mechanism and t-slot profile 21 may move up and down, parallel to t-slot 22. FIG. 14 shows t-slot profile 21 lowered down, and the bottom 25 of t-slot profile is not visible because it is beyond the lower edge of the frame of FIG. 14. In FIG. 15, t-slot profile 21 has been raised so that the bottom 25 of t-slot profile 21 is visible. FIG. 15 shows that handle 1 has been manipulated to lock the clamping device, and t-slot profile 21 is clamped and locked at a specific height relative to t-slot 22. FIG. 15 shows the clamping assembly being locked with handle 1 in a vertical position. FIG. 14 shows the clamping assembly as unlocked with handle 1 in a non-vertical position. It is apparent that the clamping device may be unlocked when handle 1 is in a vertical position, and locked when in a non-vertical position.

In some embodiments t-slot 22 is securely connected with table 30, as shown in FIG. 14. In these embodiments, t-slot 22 may be connected with table 30 by means of bolts, as shown in FIG. 14, or by any other means known in the art to securely connect a horizontal surface with a vertical t-slot profile.

In other embodiments, as shown in FIG. 23, t-slot 22 is connected with a horizontal t-slot profile 222, and horizontal t-slot profile 222 is clamped to horizontal t-slot profile 221 using the clamping device described herein, and profile 221 is connected with table 30. This allows the entire vertical lift arm assembly to move horizontally along an edge of table 30, thereby allowing object 40 to be positioned in three-dimensional space.

Spring 23 is an optional embodiment that may be used to regulate the speed of the descent of t-slot 21 relative to t-slot 22. There may be at least one spring 23. In a preferred embodiment, there are two springs 23, one on each side of t-slot 21, as shown in FIG. 15.

T-slot profile 21 and t-slot profile 22 may be connected with stabilizing arm 26. Stabilizing arm 26 holds spring 23 in place, prevents rod 24 from bowing out of position, and may help stabilize and support profile 22 in its vertical orientation. Rod 24 slips through spring 23, and spring 23 is connected with arm 26.

Spring 23 wraps around and surrounds pole 24. The invention comprises at least one pole 24. In a preferred embodiment, there are two poles 24, one on each side of t-slot 21, as shown in FIG. 15. Pole 24 connects bottom plate 25 of profile 21 with the top 27 of t-slot profile 21. The bottom of spring 23 connects with stabilizing arm 26 and the top of spring 23 connects with the top 27 of t-slot profile 21.

Without spring 23, when unclamped, t-slot 21 would simply descend by force of gravity. Such an uncontrolled descent may not be desirable. Since springs 23 are connected with stabilizing arm 26, springs 23 provide resistance to the force of gravity, allowing for a more controlled descent. As profile 21 descends, springs 23 compress, providing resistance to the force of gravity. Springs 23 also provide an advantage in helping move profile 21 up. Other means for controlling the descent of profile 21 may also be used, including but not limited to counterweights.

T-slot profile 21 may be moved by manipulating handle 1. In a locked position, locking foot 11 is fully engaged and locked with t-slot profile 21, and t-slot 21 will remain in a fixed position relative to t-slot 22, as shown in FIGS. 15 and 17. Manipulating handle 1 to the unlocked position will disengage locking foot 11, and t-slot profile 21 will be able to move up and down relative to t-slot 22 and table 30. In this way, t-slot 21 may be raised and lowered to a desired height. Once at the desired height, handle 1 is manipulated into the locked position, and t-slot profile is locked at the desired height.

In some embodiments, top 27 is a plate, as shown in FIG. 17. Top 27 of t-slot profile 21 connects with a horizontal beam that may be comprised of t-slot profile 28 and member 29, or may be comprised on only t-slot profile 28, or only member 29.

Horizontal t-slot profile 28 is perpendicular to t-slot 21. In a preferred embodiment the horizontal profile 28 may be permanently connected in a fixed position relative to profile 21.

In some embodiments, profile 28 may be of a fixed length, with object 40 connected directly with profile 28.

In other embodiment, profile 28 is connected with horizontal member 29, which may or may not be a t-slot profile. In these embodiments, object 40 is connected with member 29.

In embodiments where profile 28 is connected with member 29, member 29 may extend forward and retract backward over table 30. If member 29 is a t-slot profile, profile 28 may be connected with member 29 using the clamping device described herein. Or, for cost-savings, profile 28 may be connected with member 29 using knob 41, as shown in FIG. 17. Knob 41 may be loosened by turning the knob, thereby allowing member 29 to move forward and backward relative to profile 28. Then knob 41 may be tightened to secure member 29 at the desired location relative to profile 28.

A first end of member 29 is connected with profile 28 by either the clamping device described herein, or by knob 41, or by any other means known. A second end of member 29 is connected with an object 40. This allows the object 40 to be positioned along an x axis, over table 30.

In some embodiments the entire lift arm assembly may move along an edge of table 30 by using the clamping device described herein, as shown in FIG. 23. This allows object 40 to be positioned along a y axis, over table 30. In these embodiments, vertical t-slot profile 22 is connected with horizontal t-slot profile 222. In one embodiment, profile 22 is connected with profile 222 by L-shaped bracket 226. It is apparent that profile 22 and profile 222 may be connected by any means known to securely connect profiles.

In these embodiments, the operator may unlock handle 201, slid horizontal profile 222 and the vertical lift arm assembly along edge 30, along a "y" axis, into position so that the vertical lift assembly is at any desired or needed location along a horizontal "y" axis of item 50 to be photographed.

The clamping device within horizontal profile 222 connects profile 222 to horizontal profile 221, and horizontal profile 221 is securely connected with one edge of table 30.

The clamping device within horizontal profile 222 means that clamping assembly 15 is within cavity 220 (shown in FIG. 1). Linking rod 10 extends into a t-slot of horizontal profile 221, and when handle 201 is manipulated, locking foot 11 will lock profile 222 to profile 221, thereby locking the vertical lift arm assembly at a specific point along a horizontal "y" axis along an edge of table 30.

The vertical lift arm assembly may be moved horizontally along the edge of table 30 by manipulating handle 201 to release locking foot 11 and unlock the clamping device. Once unlocked, the operator may slide horizontal profile 222, which is connected with the vertical lift arm assembly, along the length of horizontal profile 221. The operator may position the vertical lift arm assembly at any position along the length of profile 221. When a desired position is reached, the operator may manipulate handle 201 to engage the clamping mechanism, thereby securely clamping profile 222 at the desired position.

In some embodiments, the vertical lift arm assembly is permanently connected to table 30, as shown in FIGS. 13 and 17. It is apparent that vertical lift arm assembly may be permanently connected at the center of table 30, or at any other location along the edge of table 30. The operator may manipulate handle 1 to unlock the clamping device in profile 22, and raise or lower vertical profile 221, so that object 40 may be at a desired height, along a "z" axis. The operator may then manipulate handle 1 to securely lock profile 221 in place along at the desired position along the "z" axis.

In some embodiments, object 40 is a camera, and the operator may use the invention to photograph the entirety of item 50, or to take a close-up photograph of a portion of item 50. Item 50 may be a large blueprint, artwork, poster, architectural drawings and other similar flat items.

The operator manipulates the clamping devices and profiles to position camera 40 as needed or desired at a point in three-dimensional space above table 30 (up to the height the vertical lift arm, along the z-axis). Once in the proper position above table 30 the operator may use camera 40 to take a photograph of item 50.

In some embodiments, if the operator wishes to photograph a large item 50 that covers most or all of table 30, the operator may position the camera 40 over the center of table 30 by moving the vertical lift arm assembly along horizontal profile 221 until the lift arm assembly is positioned in the center of the edge of table 30.

In other embodiments, horizontal profile 28, connected with member 20, may swing from right to left (and left to right) in a horizontal plane. In embodiments that include table 30, horizontal profile 28 will be parallel to table 30. In these embodiments, horizontal profile may be connected with top 27 using a screw, a post, or any other means that allows t-slot profile 28 to swing left to right and right to left in a horizontal plane. In these embodiments, it would be possible to position vertical profile 21 at a position that is not in the center of table 30, and to swing profile 28 (connected with member 29, which is connected with camera 40) over to the center of table 30.

The operator may extend or retract profile 28 and member 29 to position camera 40, along an "x" axis, directly over the center of item 50, or at some other point over item 50, and lock camera 40 in place.

The operator may manipulate handle 1 to unlock the clamping device in profile 22, and raise or lower vertical profile 221, so that camera 40 may be at a sufficient height, along a "z" axis to take a photograph of the item 50. The operator may then manipulate handle 1 to securely lock profile 221 in place along at the desired position along the "z" axis.

Item 50 may comprise a large flat item, which may or may not have wrinkles or fold lines. If a blueprint, artwork, or other large flat item is wrinkled, or has been folded, it may be difficult, if not impossible, for a camera to get the entire item in focus because wrinkles cause slight variations in the height of the object. To take a photograph of a large wrinkled item, the camera would have to be very far away, which is impractical when taking photographs of large items.

The invention removes wrinkles and makes the item 50 smooth and flat with essentially no variation in height to allow camera 40 to focus on the item 50 while relatively close to the item 50, as shown in FIG. 13. Vacuum pump 53 will create a vacuum, and will pull item 50 flat against table 30, flattening or removing the wrinkles, and thereby making it easier to focus camera 40 on the item 50.

In some embodiments, the operator lifts sheet 31, and optionally uses support arm 32 to hold sheet 31 up. Sheet 31 may be made of plastic, plexiglass, glass, or any other relatively solid and see-through material. Sheet 31 is large enough to cover all holes 33 when sheet 31 is lowered to the top of table 30.

Item 50 may be placed on table 30 to cover at least some holes 33, as shown in FIG. 20. The operator may place tape or covering 52 around item 50, so that all holes 33 are covered by either item 50 or covering 52, as shown in FIG. 17. The operator disengages support arm 32 and lowers sheet 31, so that sheet 31 rests on top of item 50 and covering 52, which in turn rest on top of table 30 covering all holes 33.

FIG. 21A shows a cross-section of sheet 31 in a closed position, on top of item 50 and covering 52, both of which are on top of table 30. When the operator turns on vacuum 53, sheet 31, covering 52, and item 50 slow or prevent the flow of air through holes 33 into table 30, and a vacuum is created inside table 30, in space 38. The vacuum pulls item 50 flat against table 30. This vacuum pull may be adjusted as needed, using methods known in the art. The vacuum is adjusted so that item 50 is pulled against table 30 with sufficient pull to flatten item 50, and not to damage item 50.

Covering 52 may be any flat covering known in the art including, as non-limiting examples, tape, plastic, film, or paper. In this embodiment, all holes 33 will be covered by item 50 or covering 52, as shown in FIG. 17.

In other embodiments, the operator places item 50 on top of table 30, covering at least some holes 33. Film 54 may be placed on top of item 50, so that all holes 33 are covered by film 54 or item 50. Some holes 33 may be covered by both film 54 and item 50. The operator may remove support arm 32, and lower sheet 31, so that sheet 31 rests on top of film 54, which rests on top of item 50, which rests on top of table 30. See FIG. 21B. Film 54 may be comprised of any transparent material that can be placed between sheet 31 and item 50, including but not limited to transparent plastic film or other transparent, continuous polymeric material.

FIG. 21B shows a cross-section of sheet 31 in a closed position, on top of item 50 and film 54, both of which are on top of table 30. In this embodiment, when vacuum pump 53 is turned on, sheet 31, film 54, and item 50 are covering holes 33 and slow or prevent the flow of air into table 30, thereby creating a vacuum in space 38. The vacuum pulls item 50 flat against table 30. This vacuum pull may be adjusted as needed, using methods known in the art, so that item 50 is flattened against table 30, without damaging item 50.

The operator may adjust the vertical height of camera 40, to permit focusing on all of item 50, and ensuring that all of item 50 is within the frame of the photograph to be taken. With sheet 31 down and covering item 50, and the vacuum turned on to flatten and remove wrinkles or folds, the operator may take a photograph of item 50.

If the operator wanted to take a close-up of a portion of item 50, the operator may manipulate the devices to do so. In one non-limiting example, if the operator wanted to take a close-up photograph of a corner of item 50, the operator may manipulate handle 201 to unlock the clamping device and move horizontal profile 222 (and the vertical lift assembly) toward a corner of table 30 and toward a corner of item 50. Then, the operator may manipulate handle 201 to lock horizontal profile 222 in position along profile 221, so that the camera 40 will be positioned along the "y" axis above the portion of item 50 to be photographed. Profile 28 and member 29 may be manipulated to position and lock the camera 40 along the "x" axis above the portion of item 50 to be photographed. [000100] In this example, smaller portion of item 50 is being photographed after the entirety of item 50 was previously photographed. Thus, camera 40 may have to be lower than when taking a photograph of the entirety of item 50. The operator may manipulate handle 1 to allow profile 21 to slide relative to profile 22, so that the operator may position camera 40 at a sufficient height along the "z" axis to focus and take a close-up photograph of the smaller portion of item 50. Once camera 40 is at a height above item 50 that allows for focusing and photographing of the desired close-up, the operator may manipulate handle 1 to lock vertical profile 21 in position along the "z" axis. [000101] The operator manipulates the clamping devices, t-slot profiles to position camera 40 above item 50 so that camera 40 may focus on item 50, or the desired portion of item 50. Camera 40 may be further adjusted, to take photographs at an angle, by manipulating twist knobs 43, arms 42 and panning base 45, as shown in FIGS. 18 and 19. FIG. 20 shows table 30 with a large flat item 50 positioned on top of it. In a preferred embodiment, see-through sheet 31 is moveably connected with table 30 by hinge 39, and capable of opening and closing in a clamshell movement. It is apparent that any means known in the art may be used to moveably connect table 30 and sheet 31. Camera 40 is connected with member 29 by any means known in the art. FIG. 18 shows one embodiment, comprising a panning base 45. Panning base 45 connects camera 40 with member 29, and allows camera 40 to rotate (or pan) relative to member 29.

FIG. 18 shows a non-limiting example of the use of arms 42 and twist knobs 43 to connect camera 40 with member 29, and to adjust camera 40. Arms 42 and spacers 44 may be manipulated and positioned as needed to provide adjustment support to camera 40. As shown in FIGS. 18 and 19, panning base 45 may be used to rotate camera 40, and positioned at a specific point in space by manipulation of spacers 44, adjustment arms 42 and knobs 43. [000103] In some embodiments, table 30 is any horizontal surface that is capable of supporting at least one item to be photographed In some embodiments, table 30 is a vacuum table comprised of a top layer 36 positioned above a bottom layer 35, creating space 38. Top layer 36 has a plurality of holes 33 in it. The number and size of holes may be adjusted as needed to create an adequate vacuum for pulling item 50 against table 30, as explained herein.

In one embodiment, top layer 36 is positioned above bottom layer 35 by spacers 34, as shown in FIG. 21A. Spacers 34 are positioned as needed to create space 38 between layer 35 and layer 36, and without blocking holes 33. [000106] In another embodiment top layer 36 may be a perforated material that is capable of remaining flat and also capable of supporting item 50, as shown in FIG. 21B. In this embodiment, vacuum table 30 is comprised of perforated material that is capable of remaining flat when a vacuum is created in space 38, inside table 30. In this embodiment, spacers 34 are not needed to support the top layer 36, because top layer 36 will remain flat when the vacuum is turned on. Non-limiting examples of such materials comprise perforated aluminum perforated steel, perforated particle board, pegboard, and perforated wood.

In some embodiments, space 38 is bounded by edges 37, as shown in FIG. 21A. In other embodiments, top layer 36 and bottom layer 35 have lips on the edges that create an outside edge surrounding space 38, as shown in FIG. 17.

Vacuum pump 53 is connected with table 30, and when turned on will pull air from the space 38. FIG. 13 shows pump 53 connected with the front of table 30. FIG. 22 shows vacuum pump 53 connected at the bottom of table 30. It is apparent that pump 53 may be connected to any part of table 30, and by any means know in the art, so that pump 53 may create a vacuum inside table 30. [000109] In some embodiments, table 30 may be supported by t-slot profiles, as shown in FIG. 13. In other embodiments, table 30 may be on top of any type of table leg that is capable of supporting the table and associated t-slot assembly. In some embodiments, the legs of table 30 are connected with wheels, to make the entire table moveable.

Using the invention described herein, camera 40 may be used to take one or more photographs of one or more items 50. It is apparent that multiple pages of blueprints, architectural plans, or pieces of artwork may be sequentially placed on table 30 and photographed by camera 40. Each time, the operator will raise sheet 31, place item 50 on table 30, cover all holes 33, lower sheet 31, pull vacuum from space 38, and photograph item 50. The operator would then turn off the vacuum pump 53, raise sheet 31, remove item 50, and place the another item 50 on table 30. The operator would then repeat the process, as many times as needed to photograph all items 50.

Using techniques known in the art, all photographs of items 50 may be stored on a computer, server or in the cloud. Using techniques known in the art, all photographs of items 50 may be digitized.

The invention may be embodied in other specific forms without departing from the spirit or essential characteristics thereof. T-slot profiles and clamping devices may be connected as needed with additional pieces that perform functions, as needed. Non-limiting examples include connections to shelves for displaying items; connections to movable arms for displaying items; or connections to decorative treatment for a background in a display.

The embodiments disclosed in this specification are to be considered in all respects as illustrative and not restrictive, and all changes that come within the meaning and range of equivalency of the claims are intended to be embraced therein.

A recitation of "a" "an" or "the" is intended to mean "one or more" unless specifically indicated to the contrary. The use of singular or plural is intended to mean "one or more" unless specifically indicated to the contrary. The use of the words "lift" "rise" "descend" "up" "forward" or "backward" is intended to mean "lift or lower", "rise or descend", "up or down", "forward or backward" unless specifically indicated to the contrary.

What is claimed is:

1. Systems and devices for moveably clamping and easily unclamping t-slot profiles to position an object in three-dimensional space, comprising:
    two parallel, vertical t-slot profiles, wherein a first t-slot profile comprises metal forming at least one slot running the length of the first profile, and wherein a second t-slot profile comprises metal forming a cavity sized to snugly receive an elevator and guides;
    a clamping assembly, said clamping assembly comprising the elevator and a bushing tightly sandwiched between guides,
    a cam rod running through the elevator and guides and having a pocket that is positioned near the bushing within the elevator,
    a linking rod connecting the elevator to a locking foot, wherein the locking foot is sized to moveably fit within said slot running the length of the first profile when said locking foot is unclamped,
    a handle connected with the cam rod, wherein manipulating the handle in a first direction will move the cam rod, thereby moving the pocket relative to the bushing, lifting the elevator, linking rod, and locking foot, compressing the locking foot against an inside surface of the slot running the length of the first t-slot profile, thereby locking the two t-slot profiles together;
    the second t-slot profile has a bottom end that is connected with a horizontal table;
    the first t-slot profile connects with the second t-slot profile by the clamping assembly, wherein when the clamping assembly is unlocked, the first t-slot profile may move up and down relative to the second t-slot profile, and wherein the first t-slot profile is vertical with a top end and a bottom end;
    a horizontal beam connected with the top of the first t-slot profile, extending out over the horizontal table wherein the horizontal beam is connected with an object that may be positioned above the table.

2. The systems and devices of claim 1 wherein the horizontal beam is comprised of a horizontal t-slot profile and member,
    wherein one end of the horizontal t-slot profile is connected with the top of the first vertical profile, and the second end of the horizontal t-slot profile is connected with a horizontal member,
    and wherein the horizontal member may extend horizontally forward and backward over the table.

3. The systems and devices of claim 2 wherein the horizontal member is a t-slot profile and the clamping assembly moveably connects the two horizontal t-slot profiles.

4. The systems and devices of claim 2 wherein the horizontal member is not a t-slot profile and a knob moveably connects the horizontal t-slot profile and horizontal member.

5. The systems and devices of claim 1 wherein an edge of the table is connected with a first horizontal t-slot profile comprising metal forming at least one slot running the length of the first horizontal profile, wherein a second clamping assembly connects the first horizontal t-slot profile to a second horizontal t-slot profile comprised of a cavity sized to snugly receive the elevator and guides of the second clamping assembly, wherein when the second clamping assembly is unlocked the second horizontal t-slot profile may move horizontally along the first horizontal t-slot profile, and when the second clamping assembly is locked the second horizontal t-slot profile is secured in a fixed position to the first horizontal t-slot profile.

6. The systems and devices of claim 5 wherein the bottom end of the second vertical t-slot profile is connected with the second horizontal t-slot profile, thereby connecting the second vertical t-slot profile to the horizontal table, and thereby allowing the two vertical t-slot profiles to be moved along the edge of table 30, and locked at a specific position along the edge of table 30.

7. The systems and devices of claim 6 wherein the object may be positioned above the table by locking the second horizontal t-slot profile at a specific position along the first horizontal t-slot profile, and by locking the first vertical t-slot profile to the second vertical t-slot profile at a specific height.

8. The systems and devices of claim 7 wherein the object is a camera and the table is a vacuum table, comprising: the vacuum table with a top surface with a plurality of perforation, a solid bottom surface, and side surfaces, forming a space inside of these surfaces;

a vacuum pump that is connected with, and capable of creating a vacuum in, the space inside the table;

a clear sheet sized to cover all perforation on the top surface of the table, wherein a hinge connects the clear sheet to the top surface of the table, so that the clear sheet may be opened and closed while remaining connected to the table;

lifting the sheet and placing a large flat item on the top surface of the vacuum table covering at least some perforations in the top surface;

covering all uncovered perforations in the top surface with a covering;

lowering the clear sheet on top of the item, covering, and table;

manipulating the handle on the clamping assembly connecting the vertical t-slot profiles to unlock the clamping assembly and position the camera at a specific height above the vacuum table, and then manipulating the handle to lock together the vertical t-slot profiles;

manipulating the handle on the clamping assembly connecting the horizontal t-slot profiles to unlock the clamping assembly and position the camera at a specific position along the edge of the vacuum table, and then manipulating the handle to lock together the horizontal t-slot profiles;

extending the beam to a specific position above the vacuum table;

focusing the camera;

turning on the vacuum, thereby creating a vacuum in the space inside the vacuum table, and pulling the item against the table;

taking a photograph.

9. The systems and devices of claim 8 wherein the covering is placed outside of the edges of the item, covering all perforations.

10. The systems and devices of claim 9 wherein the covering comprises tape, plastic, film, or cloth.

11. The systems and devices of claim 8 wherein the covering comprises polymeric film that covers the item, and any uncovered perforations.

12. The systems and devices of claim 1 wherein the table is a vacuum table comprising:

a top surface with a plurality of perforation, a solid bottom surface, and side surfaces, forming a space inside of these surfaces;

a vacuum pump that is connected with, and capable of creating a vacuum in, the space inside the table;

a clear sheet sized to cover all perforation on the top surface of the table, wherein a hinge connects the clear sheet to the top surface of the table, so that the clear sheet may be opened and closed while remaining connected to the table.

13. The systems and devices of claim 12 wherein the vacuum table has spacers to support the top surface.

14. The systems and devices of claim 12 wherein the vacuum table does not have spacers to support the top surface.

15. The systems and devices of claim 12 wherein the perforated top surface of the vacuum table may comprise perforated aluminum, perforated steel, perforated particle board, perforated pegboard, and perforated wood.

16. The systems and devices of claim 1 wherein at least one stabilizing arm connects the first and second vertical t-slot profiles, and the bottom of at least one spring connects with the stabilizing arm and the top of the spring connects with the top end of the first vertical t-slot profile, and wherein a pole is inside the spring and the pole top connects with the top end of the first vertical t-slot profile and the pole bottom connects with the bottom end of the first vertical t-slot profile.

17. The systems and devices of claim 1 wherein the object is a camera.

\* \* \* \* \*